(12) United States Patent
Furukawa et al.

(10) Patent No.: US 10,712,983 B2
(45) Date of Patent: Jul. 14, 2020

(54) MANAGEMENT DEVICE, IMAGE FORMING APPARATUS, MEDIUM APPLICATION SYSTEM, MANAGEMENT METHOD, AND COMPUTER-READABLE RECORDING MEDIUM

(71) Applicant: RICOH COMPANY, LTD., Tokyo (JP)

(72) Inventors: Takahiro Furukawa, Kanagawa (JP); Hirokazu Nishikoori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/288,433

(22) Filed: Feb. 28, 2019

(65) Prior Publication Data
US 2019/0196764 A1 Jun. 27, 2019

Related U.S. Application Data

(63) Continuation of application No. PCT/JP2017/031468, filed on Aug. 31, 2017.

(30) Foreign Application Priority Data

Aug. 31, 2016 (JP) ................................ 2016-170010

(51) Int. Cl.
*G06F 3/12* (2006.01)
*B65C 9/40* (2006.01)
(Continued)

(52) U.S. Cl.
CPC .............. *G06F 3/1243* (2013.01); *B65C 3/06* (2013.01); *B65C 9/02* (2013.01); *B65C 9/40* (2013.01);
(Continued)

(58) Field of Classification Search
None
See application file for complete search history.

(56) References Cited

U.S. PATENT DOCUMENTS

2009/0242097 A1 10/2009 Esposito
2015/0131116 A1\* 5/2015 Sochi ................. H04N 1/00005
358/1.14
(Continued)

FOREIGN PATENT DOCUMENTS

DE 102014104626 10/2015
EP 2974972 10/2015
(Continued)

OTHER PUBLICATIONS

International Search Report dated Nov. 29, 2017 in PCT/JP2017/031468 filed on Aug. 31, 2017.
(Continued)

*Primary Examiner* — Fan Zhang
(74) *Attorney, Agent, or Firm* — Xsensus LLP

(57) ABSTRACT

According to an embodiment, management device includes an image formation data management unit and an inspection unit. The image formation data management unit is configured to create a formation order indicating an order of forming an image corresponding to image formation data on a medium to be applied to an application target object. The inspection unit is configured to inspect whether the image formation data in accordance with the formation order matches with a read image obtained by reading the image formed on the medium in accordance with the formation order. The image formation data management unit transmits state information in which the formation order is associated with an image formation state based on at least one of an image formation result of the image formation data and an inspection result obtained by the inspection unit.

13 Claims, 19 Drawing Sheets

(51) Int. Cl.
*B65C 9/46* (2006.01)
*G06Q 10/06* (2012.01)
*G06Q 50/04* (2012.01)
*B65C 3/06* (2006.01)
*B65C 9/02* (2006.01)
*G06K 15/02* (2006.01)

(52) U.S. Cl.
CPC ............. *B65C 9/46* (2013.01); *G06F 3/121* (2013.01); *G06F 3/1282* (2013.01); *G06K 15/024* (2013.01); *G06Q 10/06395* (2013.01); *G06Q 50/04* (2013.01); *B65C 2009/404* (2013.01); *Y02P 90/30* (2015.11)

(56) References Cited

U.S. PATENT DOCUMENTS

2017/0004122 A1\* 1/2017 Taniguchi .......... G06K 9/00416
2018/0286033 A1\* 10/2018 Ishiyama ................. G06T 7/30

FOREIGN PATENT DOCUMENTS

JP 2014-073847 4/2014
JP 2015-093411 5/2015

OTHER PUBLICATIONS

Written Opinion dated Nov. 29, 2017 in PCT/JP2017/031468 filed on Aug. 31, 2017.

\* cited by examiner

[Fig. 1]
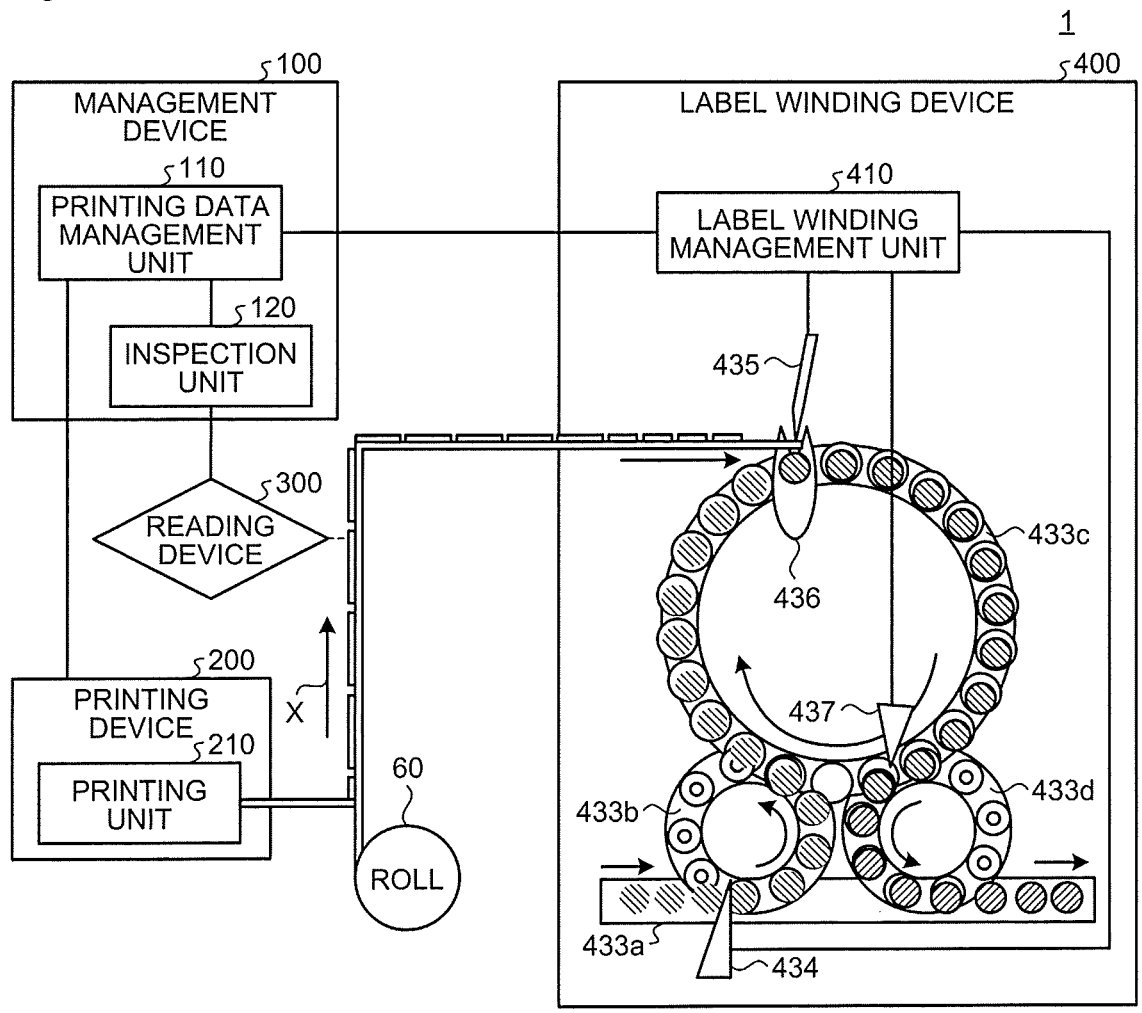
[Fig. 2]
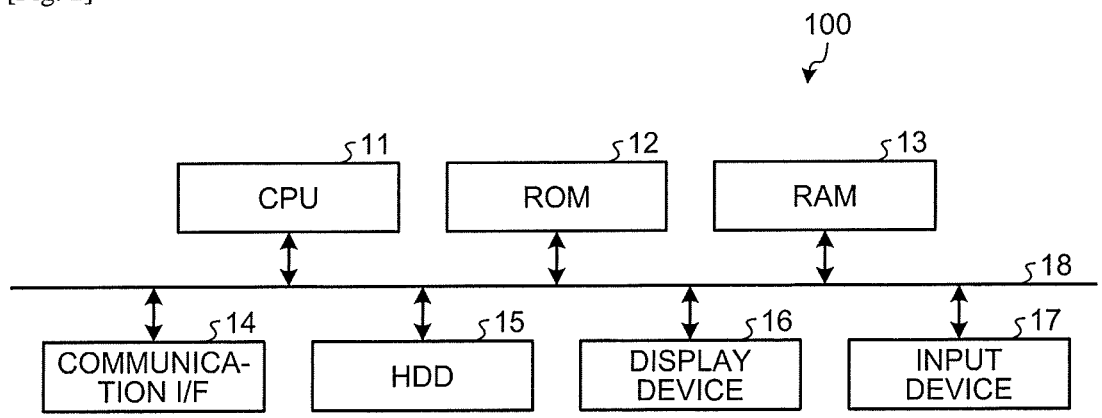

[Fig. 3]
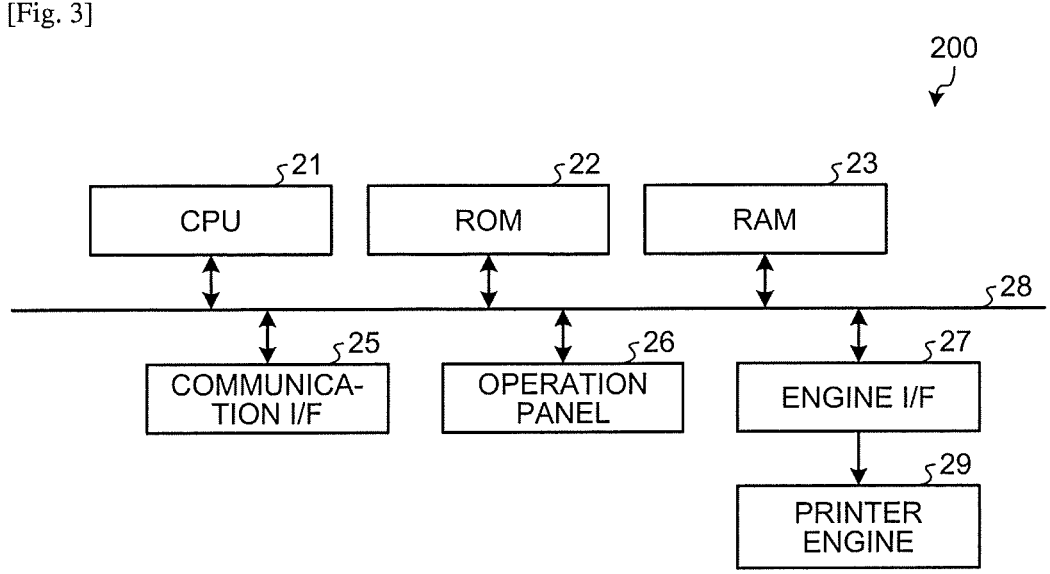
[Fig. 4]
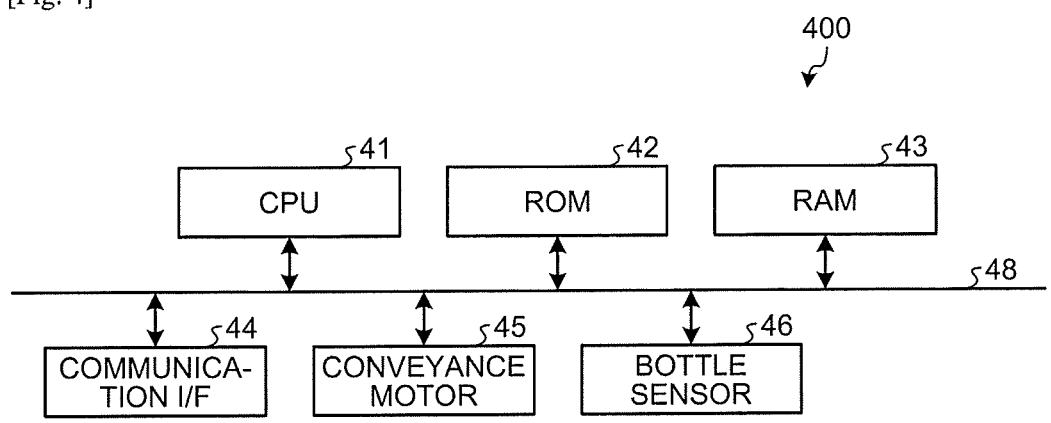

[Fig. 5]
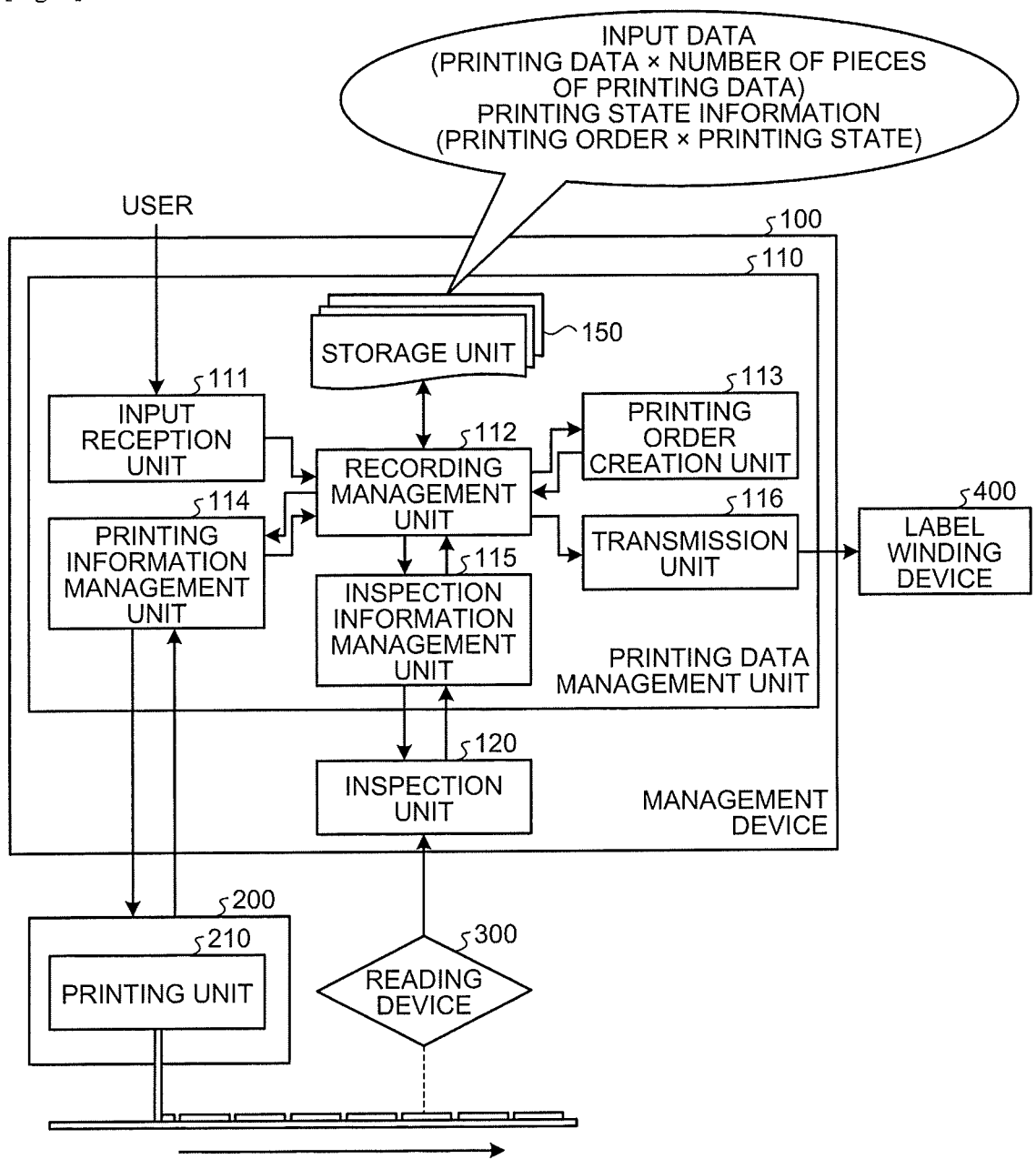

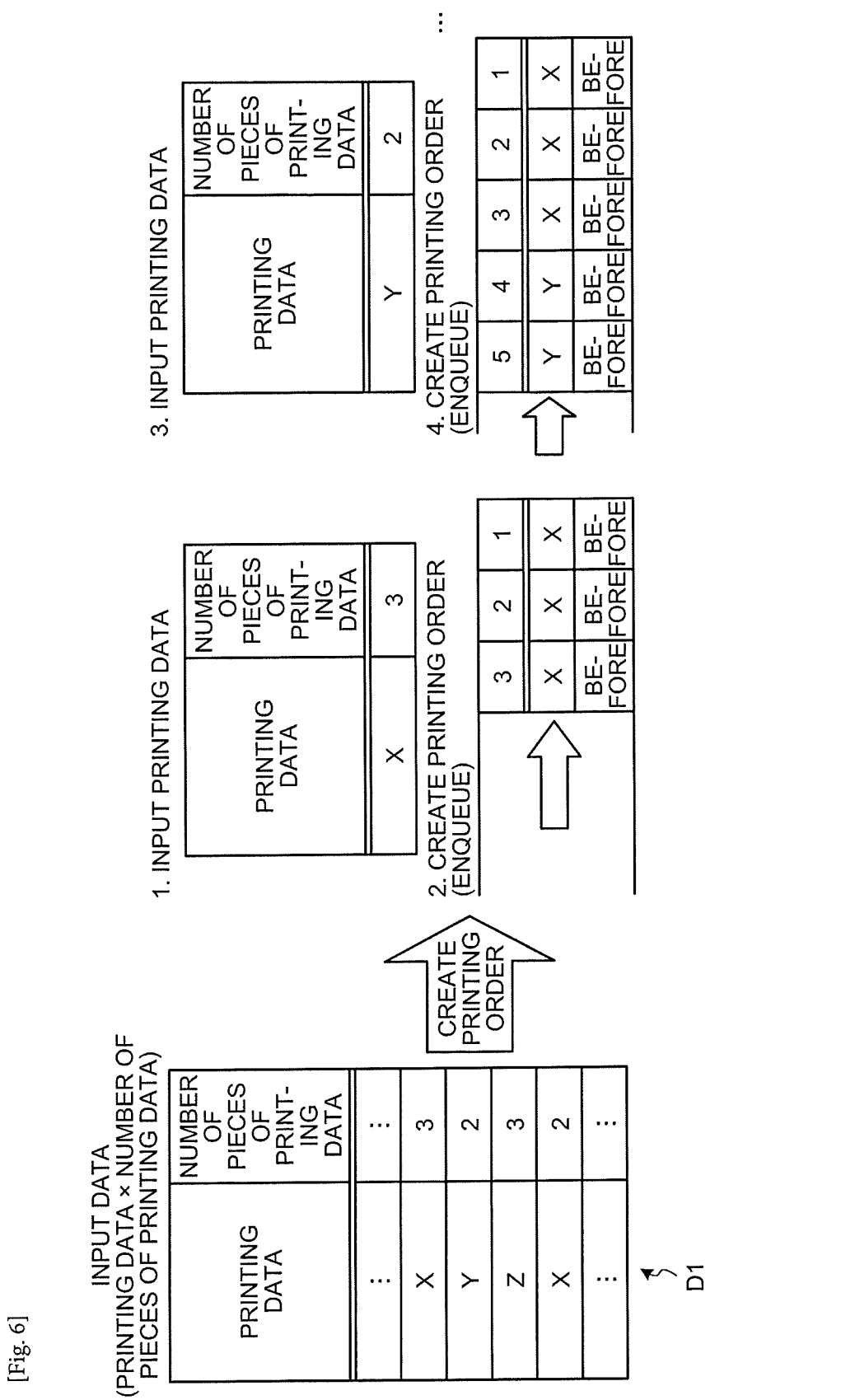
[Fig. 6]

[Fig.7]

PRINTING STATE INFORMATION

[IMMEDIATELY AFTER PRINTING ORDER IS CREATED]

PRINTING ORDER IS EARLIER → PRINTING ORDER IS LATER

| PRINTING DATA | ... | X | X | X | Y | Y | Z | Z | Z | X | X | ... |
|---|---|---|---|---|---|---|---|---|---|---|---|---|
| PRINTING STATE | | BEFORE | BEFORE | BEFORE | BEFORE | BEFORE | BEFORE | BEFORE | BEFORE | BEFORE | BEFORE | |

[WHEN PRINTING IS SEQUENTIALLY PERFORMED]

| PRINTING DATA | ... | X | X | X | Y | Y | Z | Z | Z | X | X | ... |
|---|---|---|---|---|---|---|---|---|---|---|---|---|
| PRINTING STATE | | OK | NG | OK | OK | COMPLETED | COMPLETED | DURING | BEFORE | BEFORE | BEFORE | |

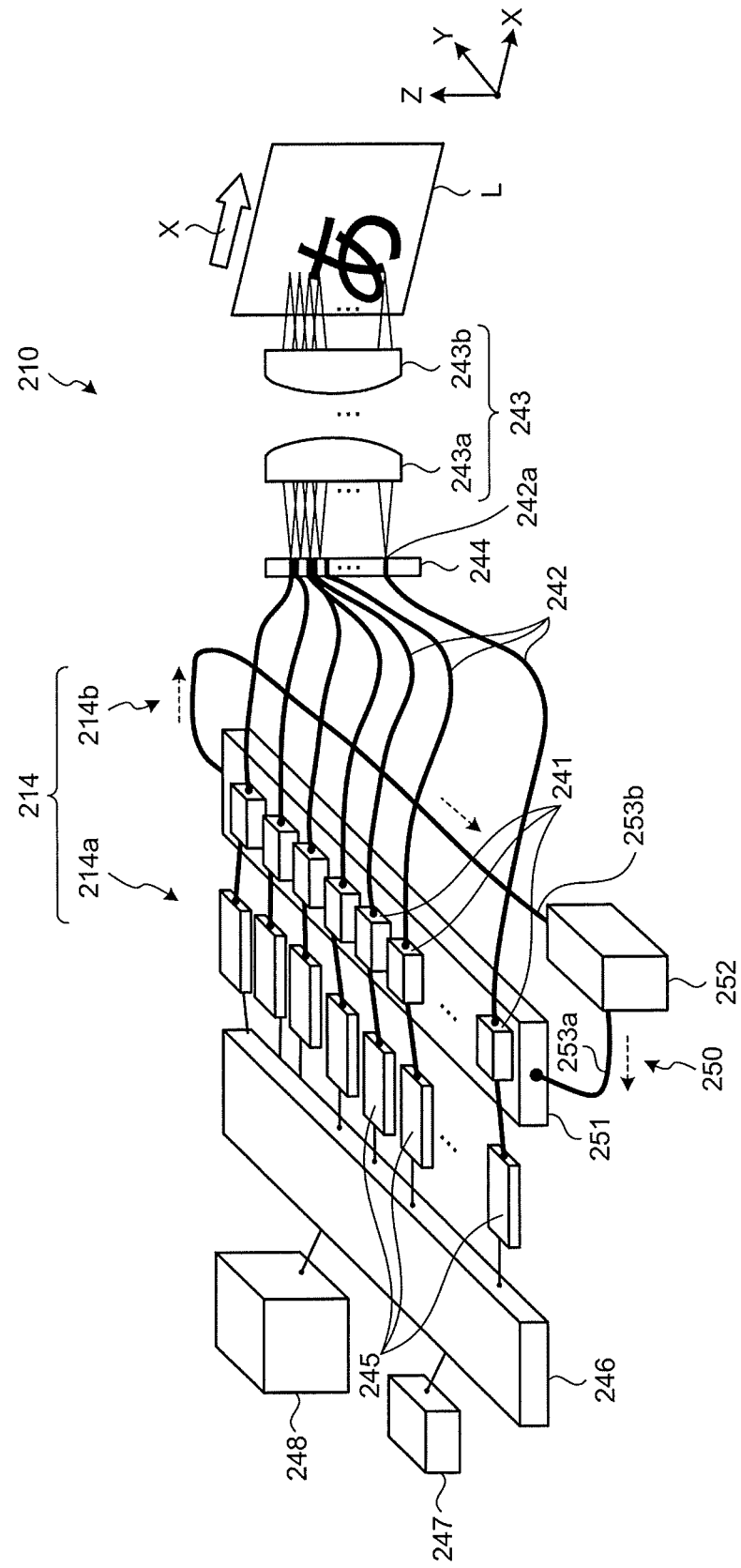
[Fig. 8]

[Fig. 9-1]
1. PRINT PRINTING DATA OF SECOND PRINTING ORDER
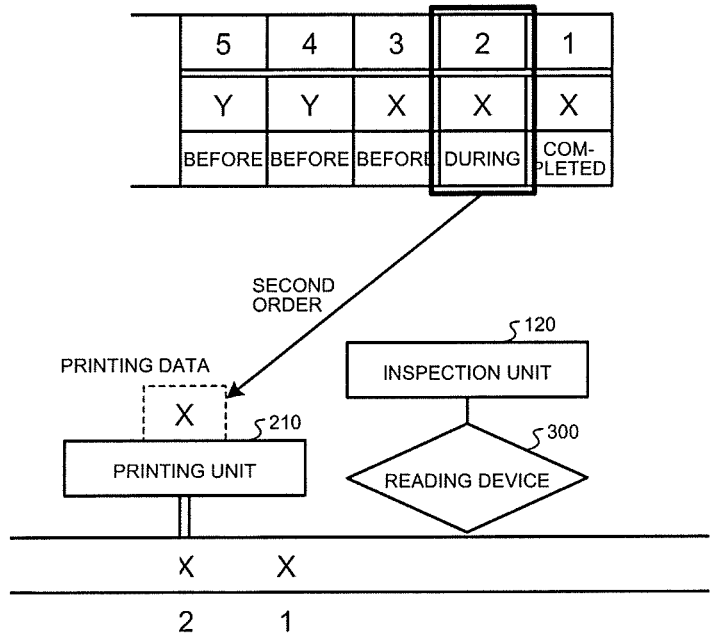
[Fig. 9-2]
2. READ/INSPECT PRINTING DATA OF SECOND PRINTING ORDER, AND PRINT PRINTING DATA OF FIFTH PRINTING ORDER
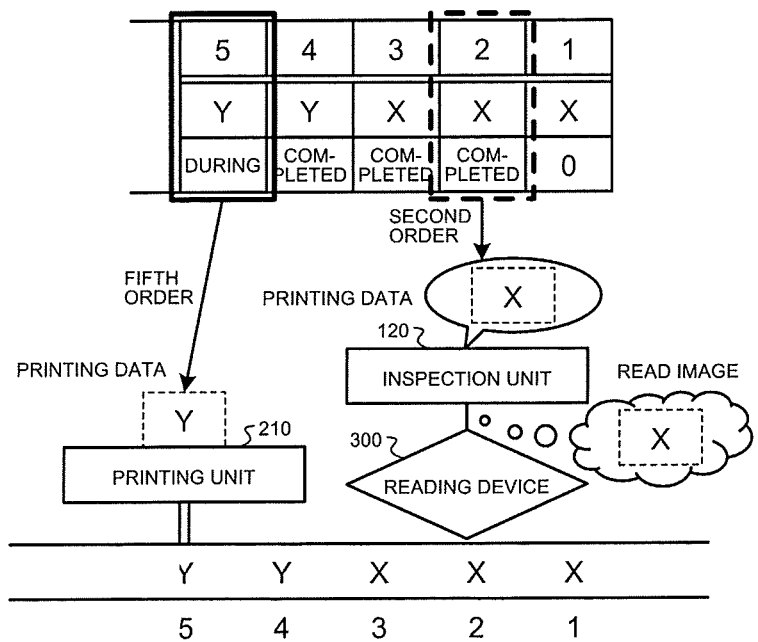

[Fig. 10-1]
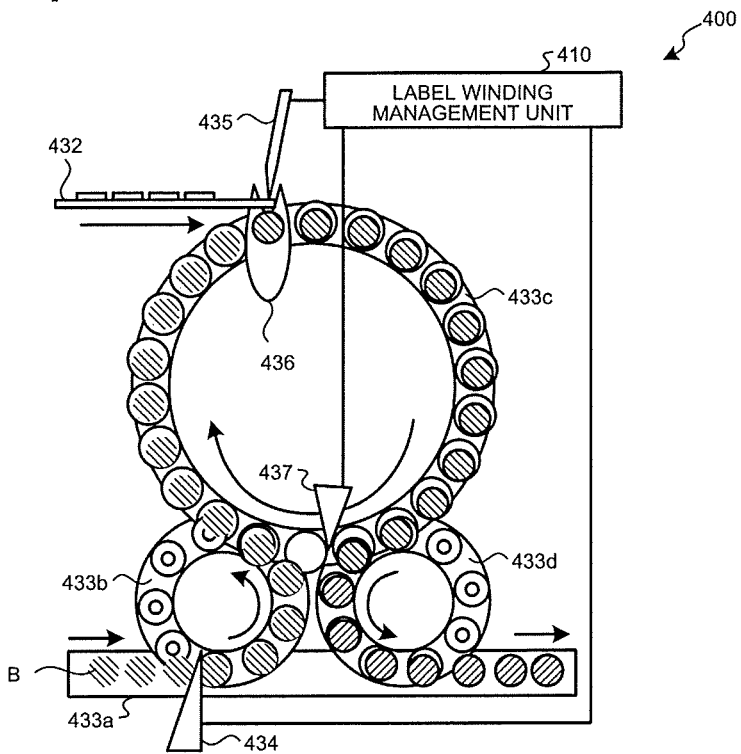
[Fig. 10-2]
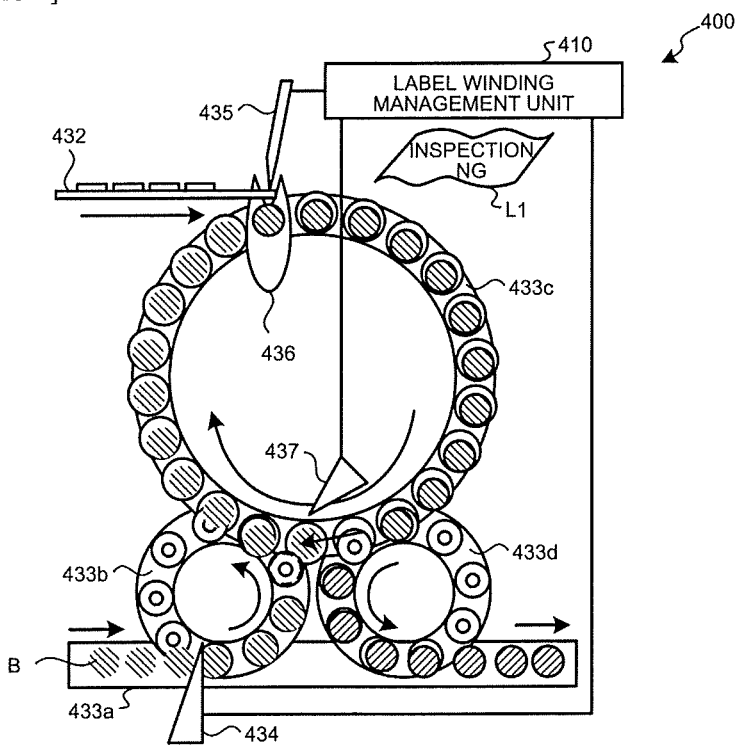

[Fig. 11]
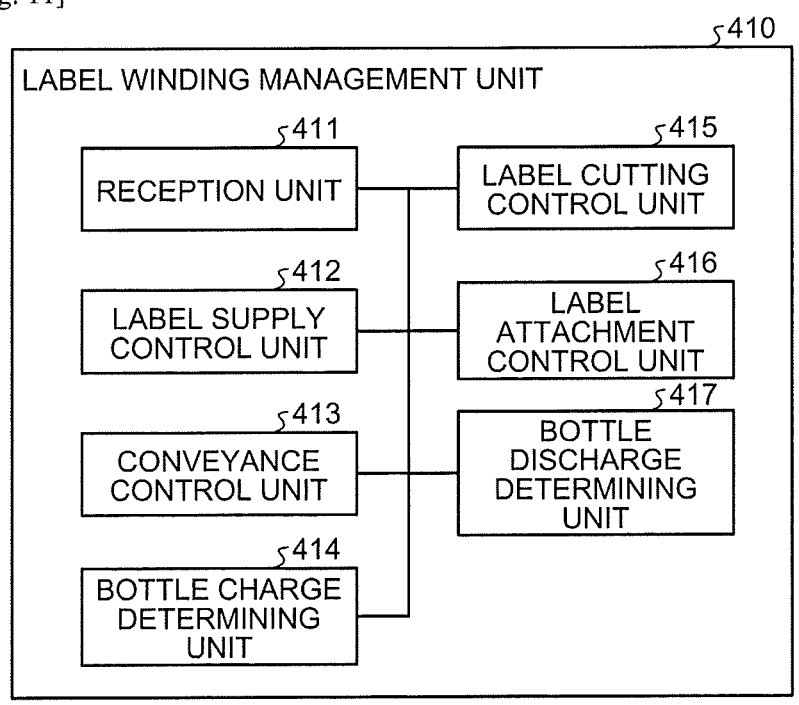

[Fig. 12]
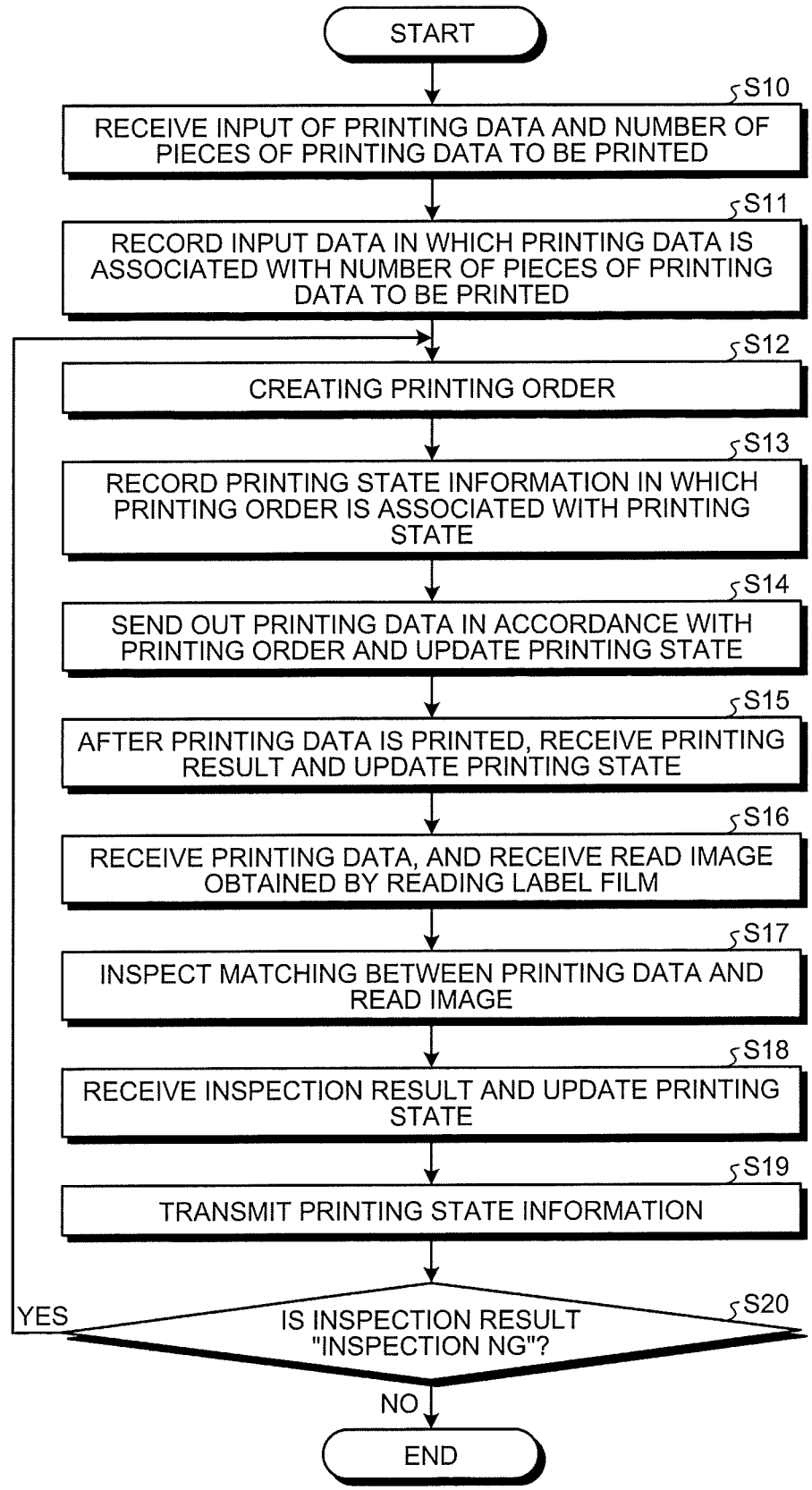

[Fig. 13]
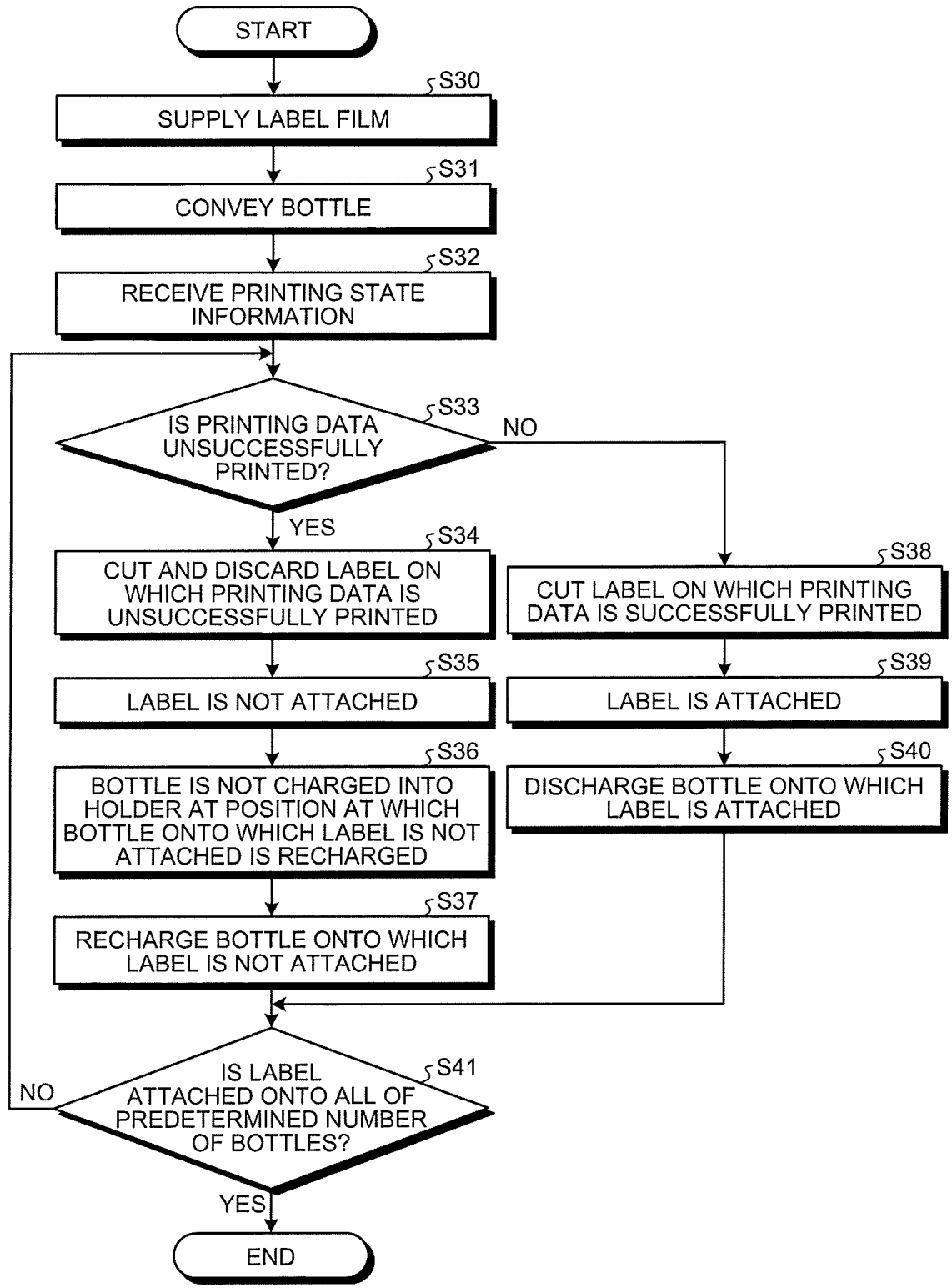

[Fig. 14]
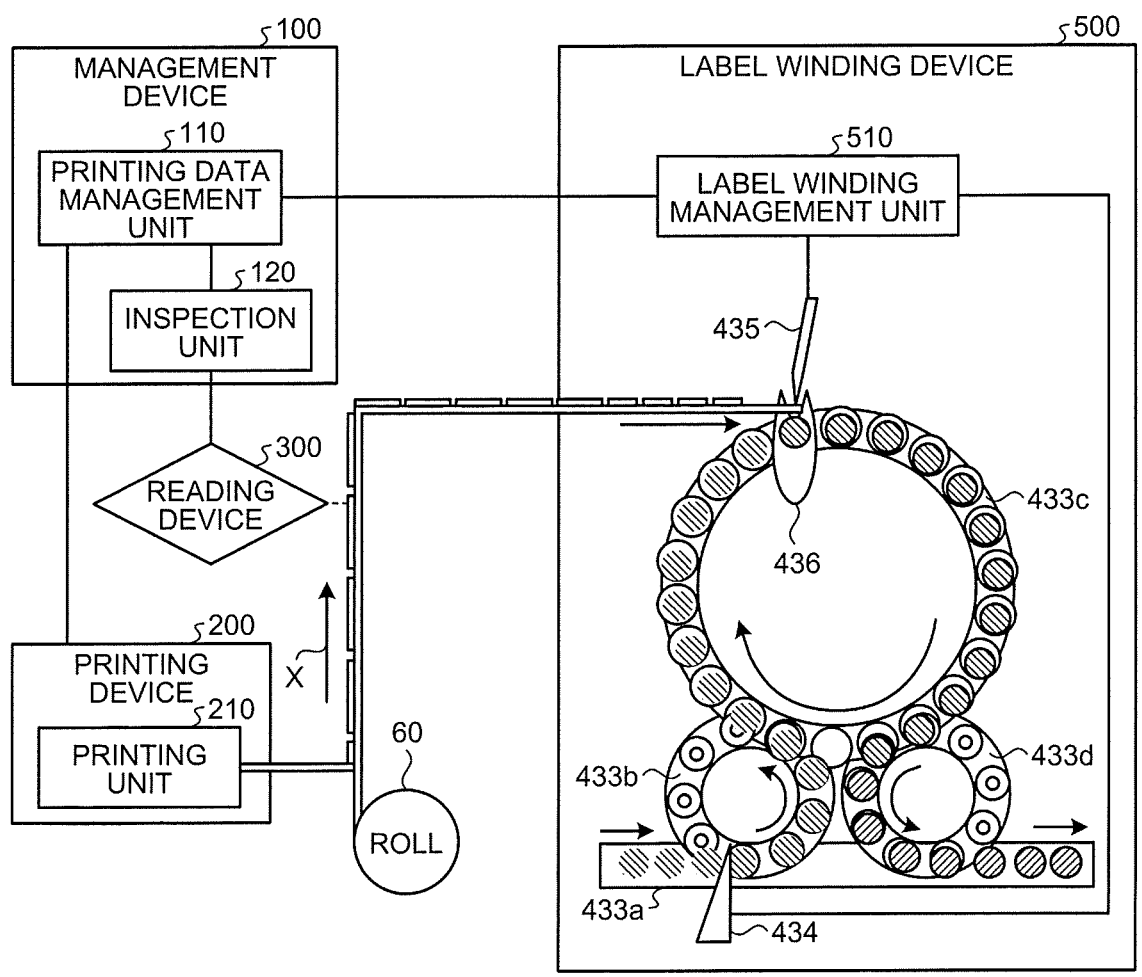

[Fig. 15-1]
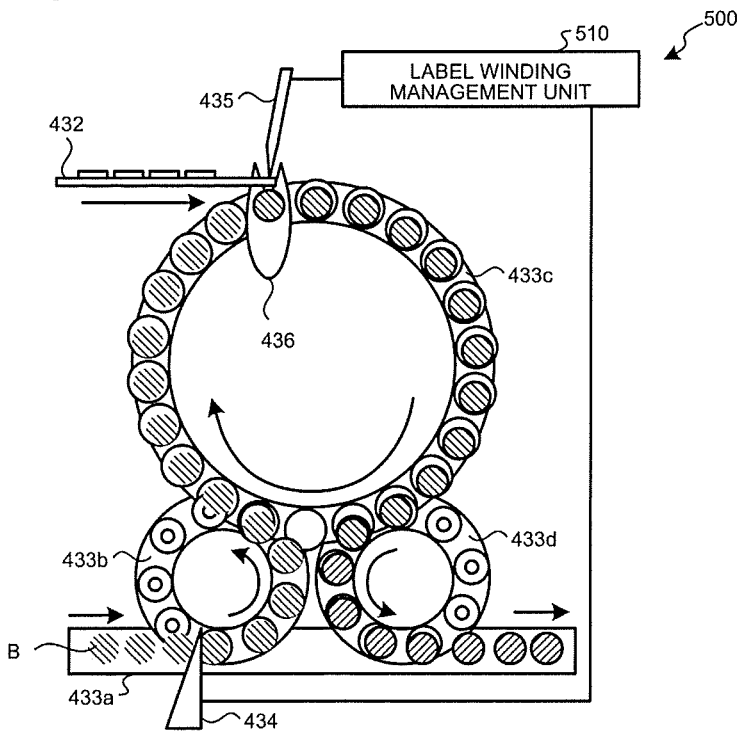
[Fig. 15-2]
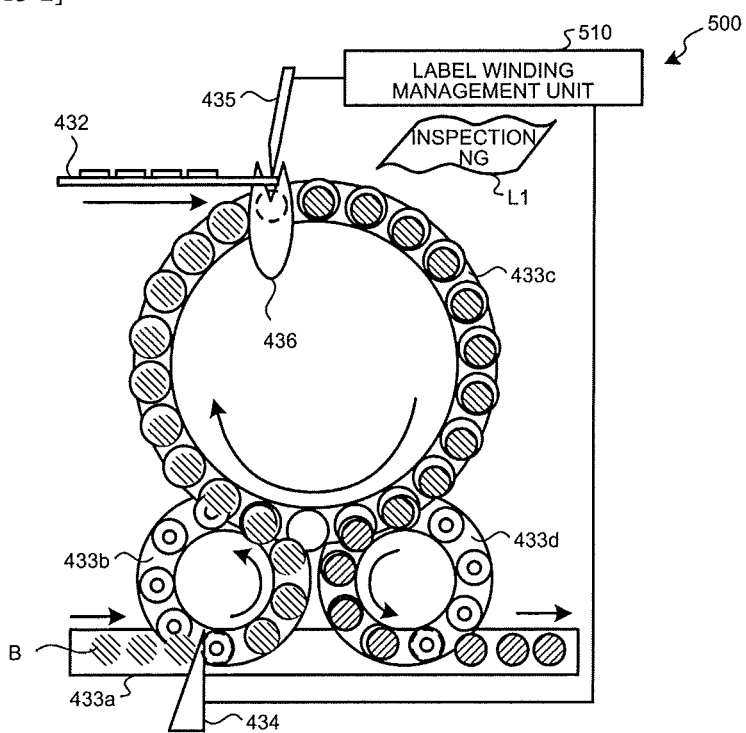

[Fig. 16]
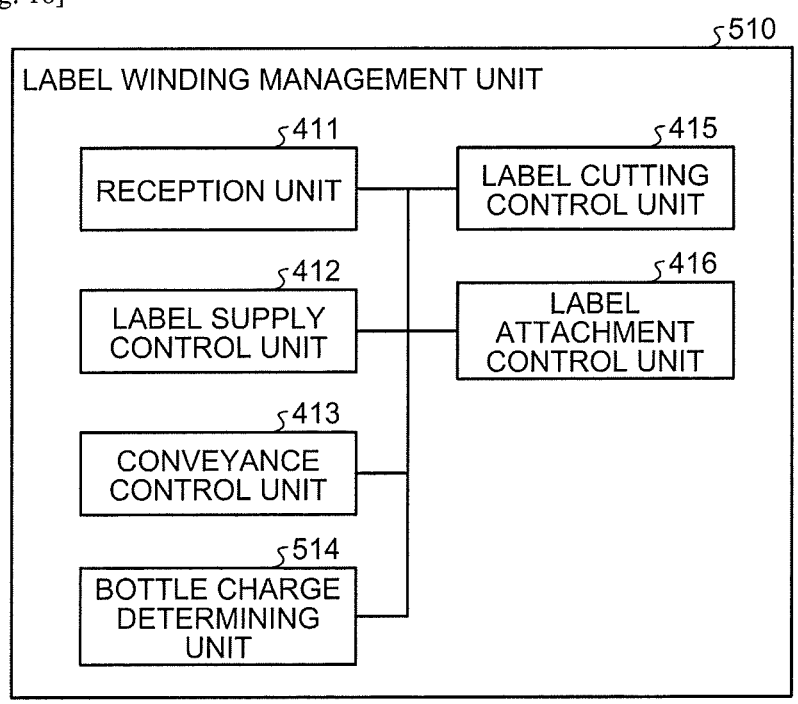

[Fig. 17]
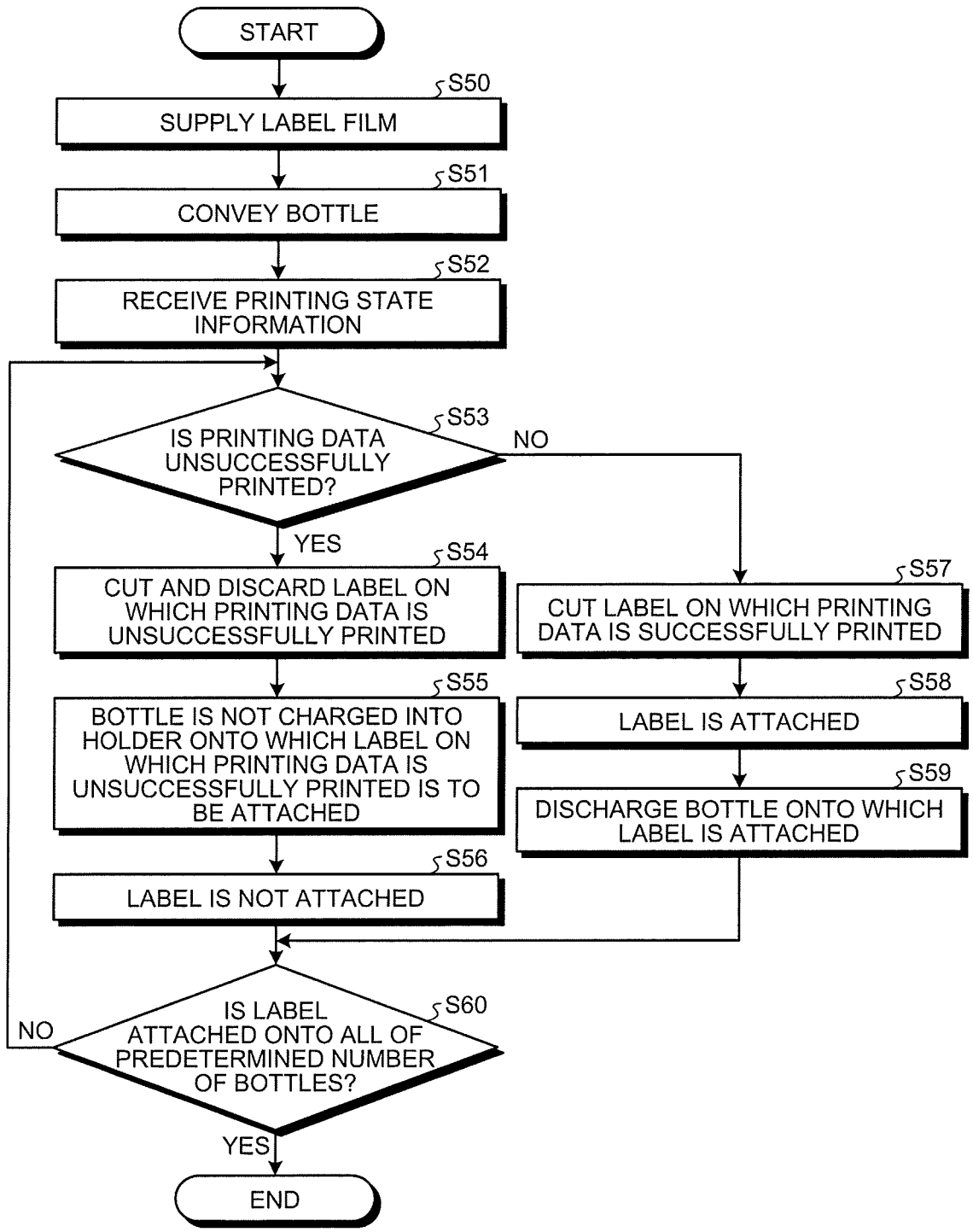

[Fig. 18]
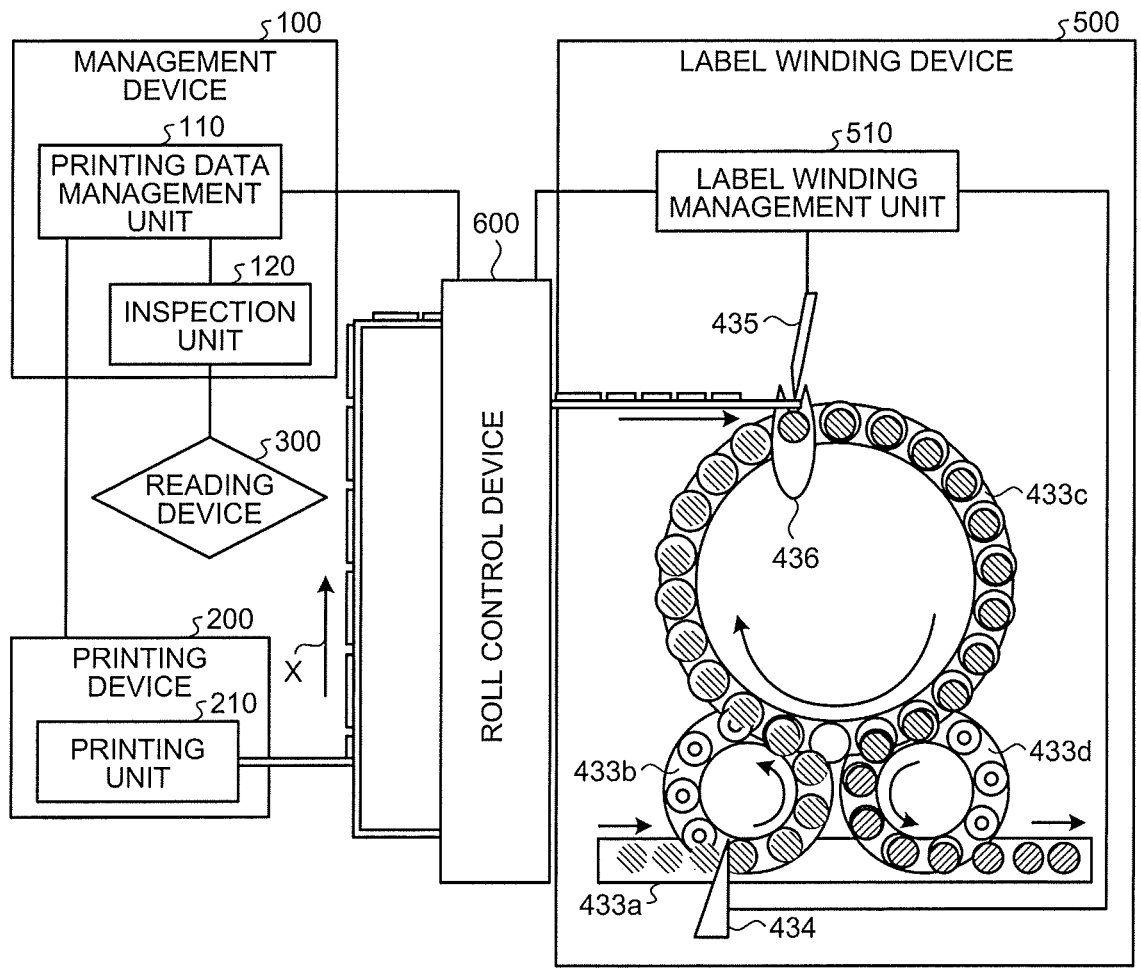
[Fig. 19]
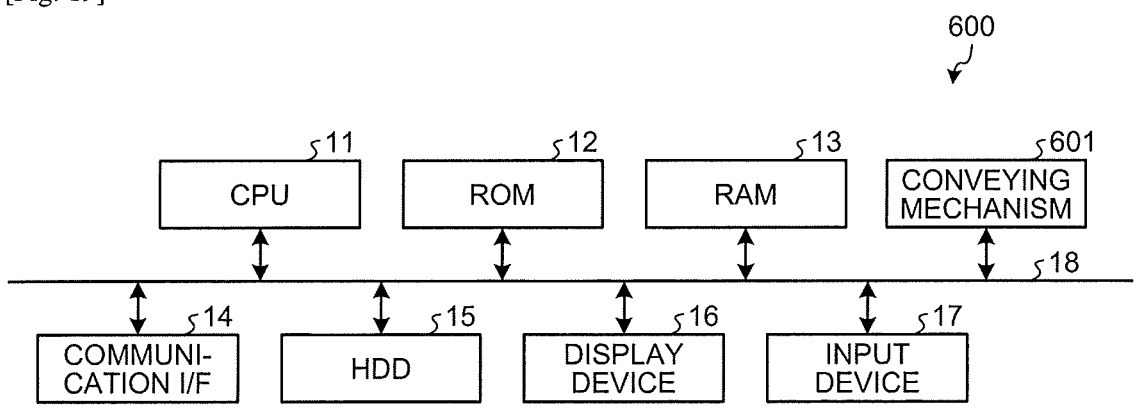

[Fig. 20-1]
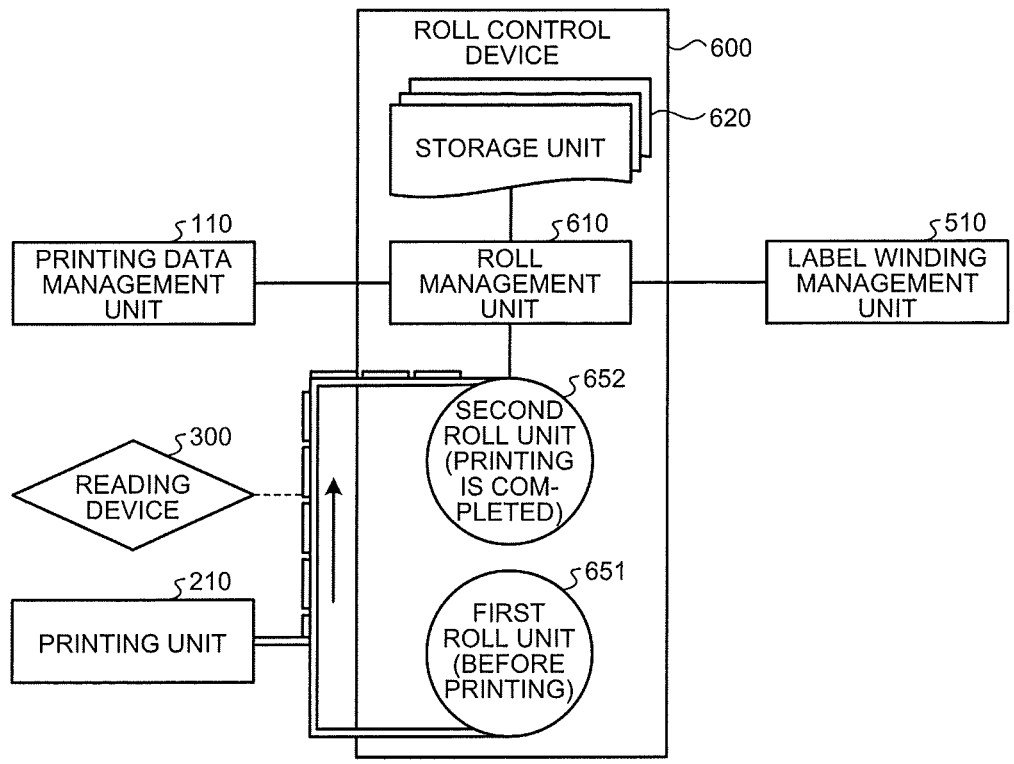
[Fig. 20-2]
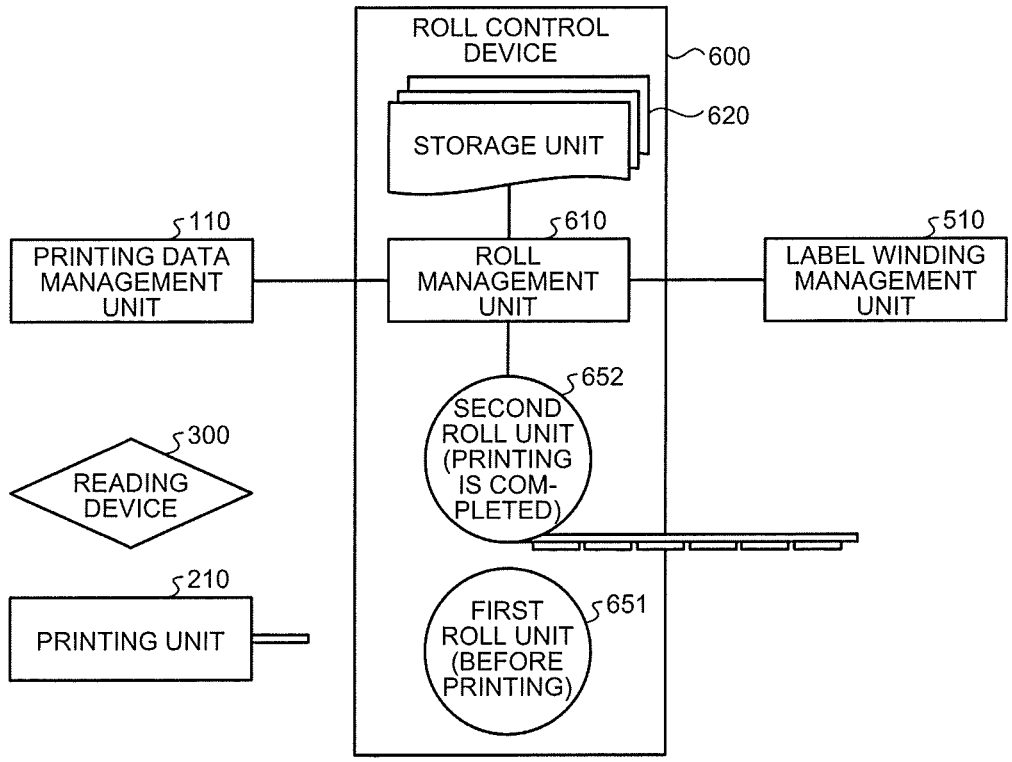

[Fig. 21]
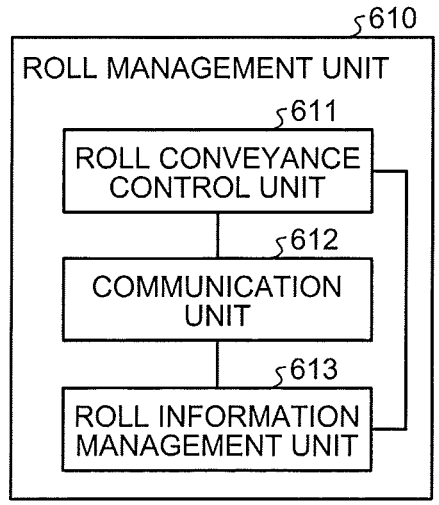
[Fig. 22]
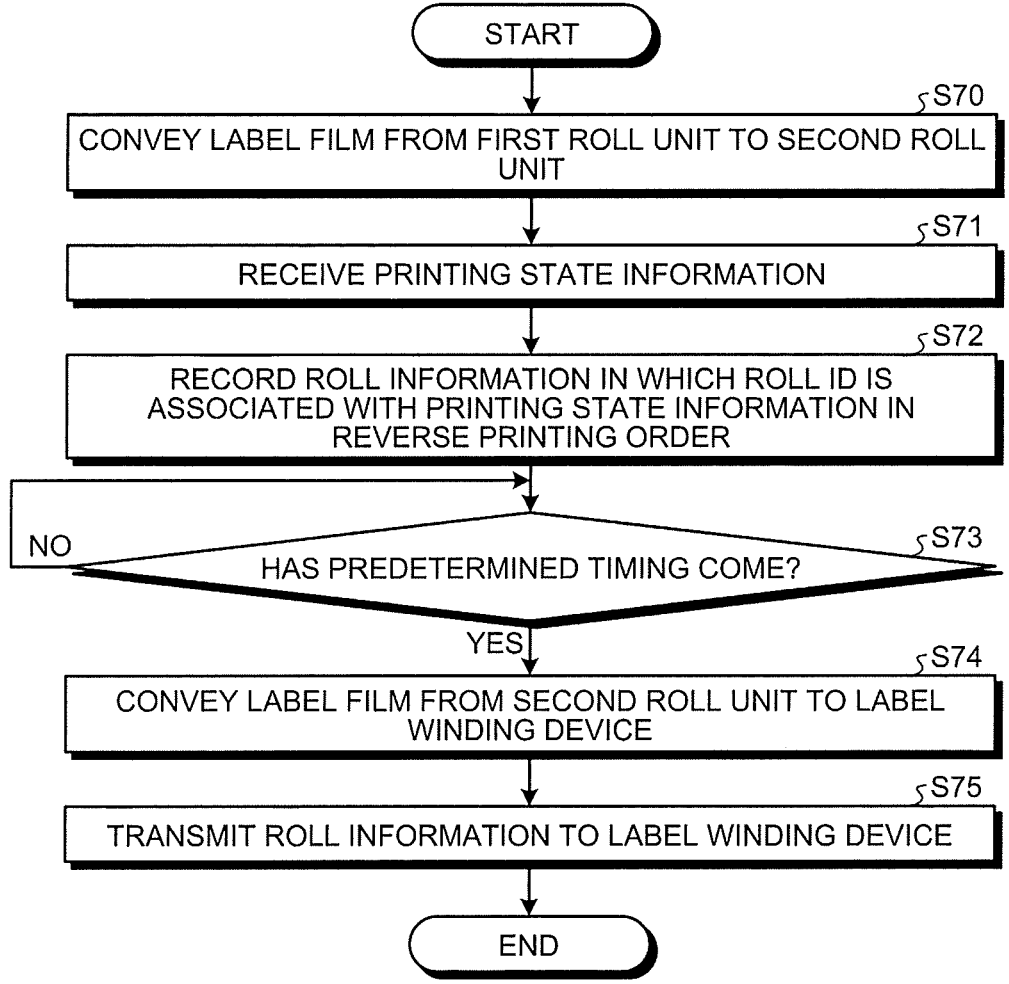

[Fig. 23]
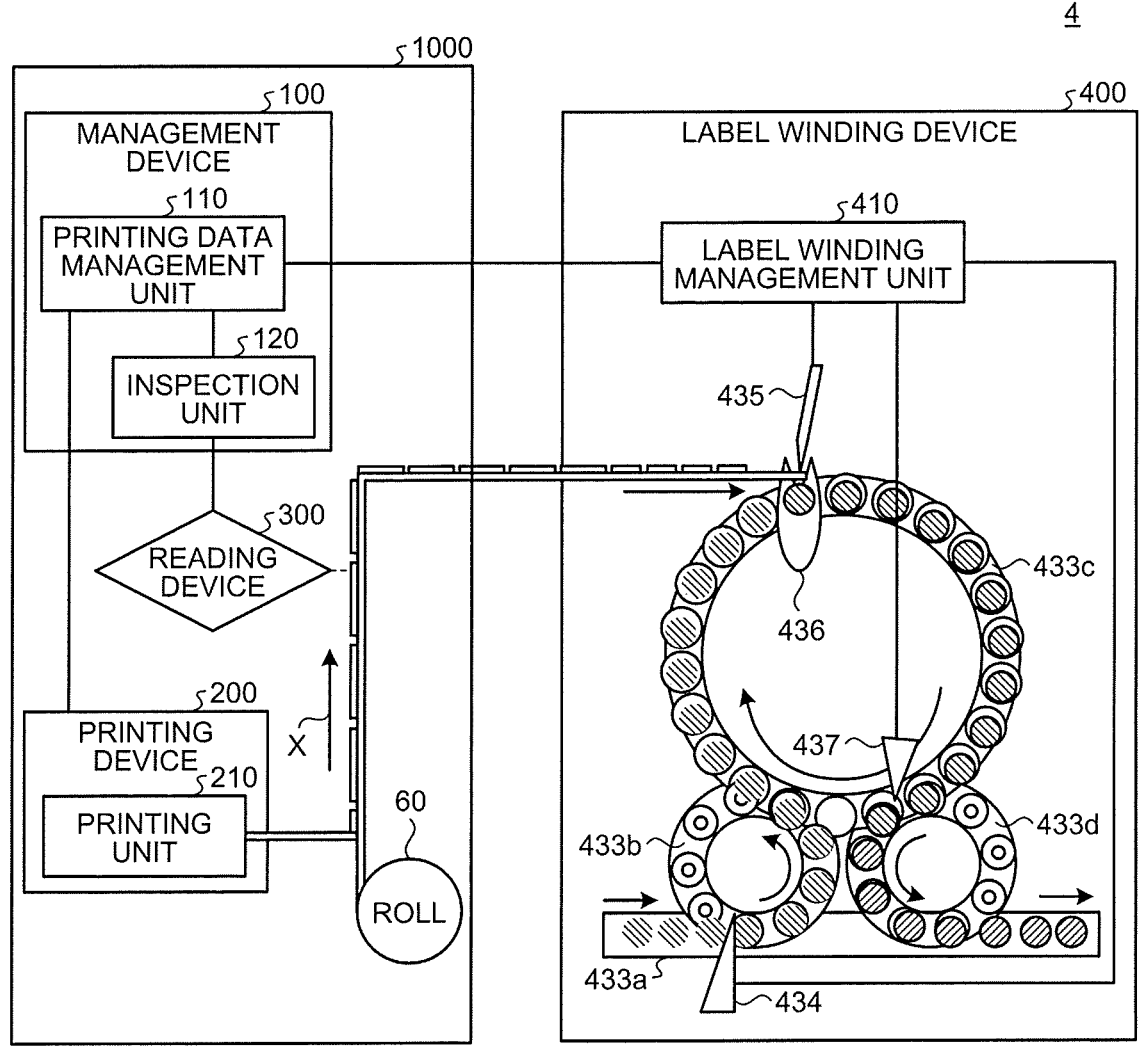

MANAGEMENT DEVICE, IMAGE FORMING APPARATUS, MEDIUM APPLICATION SYSTEM, MANAGEMENT METHOD, AND COMPUTER-READABLE RECORDING MEDIUM

CROSS-REFERENCE TO RELATED APPLICATIONS

This application is a continuation of PCT international application Ser. No. PCT/JP2017/031468 filed on Aug. 31, 2017 which designates the United States, incorporated herein by reference, and which claims the benefit of priority from Japanese Patent Applications No. 2016-170010, filed on Aug. 31, 2016, incorporated herein by reference.

BACKGROUND OF THE INVENTION

1. Field of the Invention

Embodiments relate to a management device, an image forming apparatus, a medium application system, a management method, and a computer-readable recording medium.

2. Description of the Related Art

In the related art, there is known a technique of attaching a label and the like onto a plastic bottle that is conveyed. For example, known is a label attachment system that attaches (applies), onto a surface of a plastic bottle (an application target object), a label (medium) on which content related to a cooling drink or the like to be injected into the plastic bottle is printed (formed as an image) (refer to Japanese Unexamined Patent Application Publication No. 2014-73847).

In the label attachment system, a large number of bottles as containers are arranged in a line and conveyed on a horizontal plane. The label attachment system sends out a long-length label base material on which a large number of labels are printed at regular intervals to be cut into pieces of labels. The cut labels are sequentially conveyed to a conveyance path of the bottle, and attached onto each bottle on the conveyance path. The bottles each having the label attached thereto are arranged in a line again on a horizontal plane to be taken out.

In recent years, a bottling factory and the like prints desired content on a label before a process of attaching the label in some cases.

However, in a case in which printing (image formation) content on the label (medium) are variable, inspection of the printing content cannot be performed using an inspection method similar to that for a single piece of printing content in the related art. That is, in a case in which a single piece of printing content is printed, it is sufficient that inspection based on a single comparative image is performed on all label films, but in a case in which the printing content is variable, it cannot be determined whether content printed on each label film to be inspected is desired content. As a result, a label film on which desired content is not printed is hardly detected.

In view of such a situation, there is a need to provide a management device, an image forming apparatus, a medium application system, a management method, and a computer-readable recording medium including a computer program that are capable of detecting a medium on which desired content is not formed as an image even when content to be formed as an image on a medium is variable.

SUMMARY OF THE INVENTION

According to an embodiment, a management device includes an image formation data management unit and an inspection unit. The image formation data management unit is configured to create a formation order indicating an order of forming an image corresponding to image formation data on a medium to be applied to an application target object. The inspection unit is configured to inspect whether the image formation data in accordance with the formation order matches with a read image obtained by reading the image formed on the medium in accordance with the formation order. The image formation data management unit transmits state information in which the formation order is associated with an image formation state based on at least one of an image formation result of the image formation data and an inspection result obtained by the inspection unit. The image formation data management unit comprises: an input reception unit, a recording management unit, a formation order creation unit, and a transmission unit. The input reception unit is configured to receive an input of the image formation data and number of pieces of the image formation data to be formed as images. The recording management unit is configured to generate input information in which the image formation data is associated with the number of pieces of the image formation data to be formed as images, and record the input information in a storage unit. The formation order creation unit is configured to create the formation order based on the image formation data and the number of pieces of the image formation data to be formed as images with reference to the input information. The transmission unit is configured to transmit the state information. The recording management unit generates the state information and records the generated state information in the storage unit.

BRIEF DESCRIPTION OF THE DRAWINGS

FIG. 1 is an entire configuration diagram of a label attachment system according to a first embodiment;

FIG. 2 is a hardware configuration diagram of a management device according to the first embodiment;

FIG. 3 is a hardware configuration diagram of a printing device according to the first embodiment;

FIG. 4 is a hardware configuration diagram of a label winding device according to the first embodiment;

FIG. 5 is a functional block diagram illustrating a configuration of the management device according to the first embodiment;

FIG. 6 is an explanatory diagram illustrating input data and a procedure of creating a printing order using the input data;

FIG. 7 is a diagram illustrating an example of printing state information;

FIG. 8 is a schematic perspective view illustrating a configuration of a printing unit;

FIG. 9-1 is a diagram illustrating a procedure of printing and inspection of printing data using the printing order;

FIG. 9-2 is a diagram illustrating a procedure of printing and inspection of the printing data using the printing order;

FIG. 10-1 is a configuration diagram of the label winding device according to the first embodiment;

FIG. 10-2 is a configuration diagram of the label winding device according to the first embodiment;

FIG. 11 is a functional block diagram illustrating a configuration of the label winding device according to the first embodiment;

FIG. 12 is a flowchart illustrating a procedure of transmission processing of the printing state information performed by the management device according to the first embodiment;

FIG. 13 is a flowchart illustrating a procedure of attaching a label performed by the label winding device according to the first embodiment;

FIG. 14 is an entire configuration diagram of a label attachment system according to a second embodiment;

FIG. 15-1 is a configuration diagram of a label winding device according to the second embodiment;

FIG. 15-2 is a configuration diagram of the label winding device according to the second embodiment;

FIG. 16 is a functional block diagram illustrating a configuration of the label winding device according to the second embodiment;

FIG. 17 is a flowchart illustrating a procedure of attaching a label performed by the label winding device according to the second embodiment;

FIG. 18 is an entire configuration diagram of a label attachment system according to a third embodiment;

FIG. 19 is a hardware configuration diagram of a roll control device according to the third embodiment;

FIG. 20-1 is a configuration diagram of the roll control device according to the third embodiment;

FIG. 20-2 is a configuration diagram of the roll control device according to the third embodiment;

FIG. 21 is a functional block diagram illustrating a configuration of the roll control device according to the third embodiment;

FIG. 22 is a flowchart illustrating a procedure of conveyance control processing of a label film performed by the roll control device according to the third embodiment; and FIG. 23 is a diagram illustrating another example of the entire configuration diagram of the label attachment system.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of a management device, an image forming apparatus, a medium application system, a management method, and a computer-readable recording medium in detail with reference to the attached drawings.

First Embodiment

FIG. 1 is an entire configuration diagram of a label attachment system according to a first embodiment. A label attachment system 1 illustrated in FIG. 1 is an example of a medium application system in which a management device 100, a printing device 200, a reading device 300, and a label winding device 400 are connected to each other via a network. The label winding device 400 is an example of a medium application device.

For example, in a case in which a bottling factory and the like attaches a label onto a bottle using such a label attachment system, desired content is printed on the label in an upstream (for example, a printing company) process. Meanwhile, there is a scene in which the bottling factory wants to change content to be printed on the label even though the bottle and content thereof is not changed. For example, there are a case in which the bottle on which the label is attached is shipped to a region in which a different language is used, and a case in which printing content of the label is changed because of a campaign or the like.

However, in a case in which desired content is printed on the label in an upstream process, it is necessary to hold stocks of a plurality of labels on which various pieces of printing contents are printed, and furthermore, it takes time to change the printing content. Thus, in the label attachment system 1 according to the present embodiment, desired content is printed on the label before a process of attaching the label. The following describes details about the label attachment system according to the present embodiment.

In the label attachment system 1 according to the present embodiment, a label film onto which a thermal conversion material is partly or entirely applied is wound in a roll shape to be a roll 60. As illustrated in FIG. 1, the label film is pulled out in an X-direction (conveying direction) from the roll 60, and the label film is successively conveyed from an upstream direction to a downstream direction. In a conveyance path from the upstream direction to the downstream direction, arranged are a printing device 200 that prints printing data on the label film and a reading device 300 that reads, from the label film, printing content that is printed. The label (label film) is an example of a medium, and the roll 60 is an example of a roll medium. As the medium, paper and the like on which printing data can be printed may be used in addition to the film described above.

For example, the printing device 200 prints printing data on the label film by laser irradiation. Details about printing performed by the printing device 200 will be described later. After the printing data is printed, the label film is cut in units of being attached onto a bottle, that is, for each label to be attached onto one bottle. The cut label is then wound around the bottle to be attached. Herein, printing is an example of forming an image (image formation), and the printing data is an example of image formation data. The bottle is an example of an application target object onto which the label is attached (wound).

In a process from printing to attachment, the label attachment system 1 checks whether printing is performed on the label as expected. That is, the label attachment system 1 compares printing data with read image obtained by reading an image of the label film on which printing data is printed by the reading device 300, and performs inspection for verifying matching. The label having a normal inspection result (label the read image of which matches with the printing data) is attached onto the bottle. On the other hand, the label having a problematic inspection result (label the read image of which does not match with the printing data) is not attached onto the bottle and discarded. The label attachment system 1 reprints printing data having the same content as the printing content of the discarded label.

The label having a normal inspection result means a label on which printing data including desired content is printed, and may also be referred to as a label of "inspection OK" and the like. The label having a problematic inspection result means a label on which defective printing is performed, for example, printing is blurred or thin, or on which printing data different from desired printing data is printed, and may also be referred to as a label of "inspection NG" and the like.

The management device 100 is a device that manages information about printing data to be printed on the label film, and is an information processing device such as a personal computer (PC), for example. As illustrated in FIG. 1, the management device 100 is connected to the printing device 200, the reading device 300, and the label winding device 400, and mainly includes a printing data management unit 110 and an inspection unit 120 that inspects the label film on which the printing data is printed. Details will be described later.

The printing device 200 is a device including a printing unit 210 that prints the printing data on the label film as a medium, and is an image forming apparatus such as a printer, for example. The printing unit 210 is an example of an image forming unit. The reading device 300 is a device that reads printed image from the label film on which the printing data is printed, and is a scanner device, for example.

The label winding device 400 is a device that winds the label around the bottle to be attached, the label on which the printing data is printed by the printing device 200, and the inspection result of which is determined to be normal by the inspection unit 120. The label winding device 400 includes a label winding management unit 410 that controls winding of a label. Details will be described later.

Next, the following describes a hardware configuration of each device with reference to the drawings. FIG. 2 is a hardware configuration diagram of the management device according to the first embodiment. The management device 100 includes a control device such as a central processing unit (CPU) 11, a storage device such as a read only memory (ROM) 12 and a random access memory (RAM) 13, a communication I/F 14, an external storage device such as a hard disk drive (HDD) 15, a display device 16, an input device 17, and a bus 18 that connects the components to each other, and has a hardware configuration utilizing a typical computer. The communication I/F 14 is connected to the label winding device 400 to perform communication. The display device 16 is a device that displays various pieces of information such as a display apparatus. The input device 17 is used for operation input by a user with a keyboard, a mouse, and the like.

FIG. 3 is a hardware configuration diagram of the printing device according to the first embodiment. As illustrated in FIG. 3, the printing device 200 includes a CPU 21, a ROM 22, a RAM 23, a communication I/F 25, an operation panel 26, and an engine I/F 27, and the components are connected to each other via a bus 28 in a communicable manner.

The CPU 21 is an arithmetic device that controls the entire operation of the printing device 200. The ROM 22 is a nonvolatile storage device that stores a computer program for the printing device 200. The RAM 23 is a volatile storage device used as a work area for an arithmetic operation of the CPU 21.

The communication I/F 25 is an interface for communicating with the management device 100. The operation panel 26 is, for example, a touch panel, which receives an input to the printing device 200 and displays a state of the printing device 200 and the like.

The engine I/F 27 is an interface for communicating with a printer engine 29. The printer engine 29 is a hardware device that implements a printer function and the like. Herein, the printer function means a function of performing image processing on the printing data transmitted from the management device 100, and printing, on the label film as a printing medium, a plotter image having a format that can be output.

FIG. 4 is a hardware configuration diagram of the label winding device according to the first embodiment. The label winding device 400 includes a control device such as a CPU 41, a storage device such as a ROM 42 and a RAM 43, a communication I/F 44 that communicates with the management device 100, a conveyance motor 45 that causes a conveying unit such as a conveyor belt for conveying a bottle to operate, a bottle sensor 46 that senses a bottle, and a bus 48 that connects the components to each other, and has a hardware configuration utilizing a typical computer.

Next, the following describes details about the management device 100. FIG. 5 is a functional block diagram illustrating a configuration of the management device according to the first embodiment. As illustrated in FIG. 5, the management device 100 includes a printing data management unit 110 and an inspection unit 120. The printing data management unit 110 includes a storage unit 150, an input reception unit 111, a recording management unit 112, a printing order creation unit 113, a printing information management unit 114, an inspection information management unit 115, and a transmission unit 116.

The storage unit 150 records various pieces of information about the printing data, and is implemented by the HDD 15 (refer to FIG. 2). Specifically, in the present embodiment, the storage unit 150 records the printing data to be printed on the label film. The storage unit 150 also records input data (an example of input information) in which the printing data is associated with the number of pieces of printing data to be printed. The storage unit 150 also records printing state information (an example of state information) in which the printing order defining an order of printing the printing data is associated with a printing state of the printing data.

The input reception unit 111 receives various inputs from a user via the input device 17 (refer to FIG. 2). In the present embodiment, the input reception unit 111 receives inputs of the printing data to be printed on the label film and the number of pieces of printing data to be printed.

Herein, for example, the printing data includes a character, a figure, a bar code, a QR code (registered trademark) and the like (classification of an object such as an image), a character string and the like (data information), and coordinates and the like (arrangement information). The printing data exemplified herein is merely an example, and the embodiment is not limited thereto.

In the present embodiment, the printing data is input by the user. Alternatively, the embodiment may have a configuration of receiving printing data transmitted from an external device. In this case, a timing of creating or acquiring the printing data does not depend on a roll unit around which the label film is wound.

The recording management unit 112 generates input data in which the printing data and the number of pieces of printing data received by the input reception unit 111 are associated with each other, and records the input data in the storage unit 150. The recording management unit 112 sends out the generated input data to the printing order creation unit 113.

FIG. 6 is an explanatory diagram illustrating the input data and a procedure of creating the printing order using the input data. FIG. 6 illustrates input data D1 as an example of the input data. In the input data D1, the printing data (for example, X) and the number (for example, 3) are recorded in a manner associated with each other.

The printing order creation unit 113 refers to the received input data, creates the printing order indicating the order of printing the printing data based on the printing data to be printed on the label to be wound around the bottle and the number of pieces of printing data to be printed, and sends out the printing order to the recording management unit 112. The printing order is an example of a formation order, and the printing order creation unit 113 is an example of a formation order creation unit.

The following describes creation of the printing order with reference to FIG. 6. In the present embodiment, the printing order is managed based on a queue structure, and the printing data is specified based on a relative position with respect to a head of the label film. When the printing data and the number are input by the user, the printing data in units of one label is created to be enqueued. Dequeue is performed at an optional timing after the data is transmitted from the transmission unit 116 of the management device 100.

Specifically, with reference to FIG. 6, the number of pieces of printing data X to be printed is 3 at first, so that the printing data X is applied to the first to the third of the printing order. Next, the number of pieces of printing data Y to be printed is 2, so that the printing data Y is applied to the subsequent fourth and fifth of the printing order. In this way, every time when receiving an input of the printing data and the number of pieces of printing data to be printed from the user, enqueue is performed to create the printing order of the printing data. In accordance with the printing order, the printing device 200 is caused to print the printing data.

The recording management unit 112 generates printing state information in which the printing order of the printing data created by the printing order creation unit 113 is associated with the printing state of the printing data, and records the printing state information in the storage unit 150. The recording management unit 112 sends out printing data selected in accordance with the printing order to the printing information management unit 114.

The following describes an example of the printing state. FIG. 7 is a diagram illustrating an example of the printing state information. In the present embodiment, there are five printing states as follows.

1. "Before printing" that is a state after the printing order is created by the printing order creation unit 113 and before the printing data is transmitted to the printing unit 210 (in FIG. 7, referred to as "before").

2. "During printing" that is a state after the printing data is transmitted to the printing unit 210 and printing is not completed (in FIG. 7, referred to as "during").

3. "Printing completed" that is a state after the printing data is transmitted to the printing unit 210 and printing is completed (in FIG. 7, referred to as "completed").

4. "Inspection OK" that is a state in which the printing data matches with the read image as the inspection result obtained by the inspection unit 120 (in FIG. 7, referred to as "OK").

5. "Inspection NG" that is a state in which the printing data does not match with the read image as the inspection result obtained by the inspection unit 120 (in FIG. 7, referred to as "NG").

Immediately after the printing order is created, for example, as illustrated in an upper figure of FIG. 7, the recording management unit 112 does not perform printing and inspection, and does not receive a printing result and an inspection result, so that all printing states are recorded as "before" (before printing). After sending out the printing data to the printing information management unit 114, the recording management unit 112 updates the printing state to be "during" (during printing).

After receiving the printing data in accordance with the printing order, the printing information management unit 114 sends out, to the printing unit 210 of the printing device 200, the printing data in an unchanged order. The printing information management unit 114 then receives a printing result (an example of an image formation result) indicating that the printing data is completely printed from the printing unit 210, and sends out the result to the recording management unit 112.

The printing unit 210 of the printing device 200 prints the printing data transmitted in accordance with the printing order on the conveyed label film in the printing order as it is. The printing data is assumed to be sequentially received from a conveying direction of the film to be sequentially printed, for example. However, the printing order is merely an example, and the embodiment is not limited thereto.

The following describes details about a method of printing the printing data by the printing unit 210. FIG. 8 is a schematic perspective view illustrating a configuration of the printing unit. The configuration of the printing unit 210 illustrated in FIG. 8 is merely an example, so that another configuration may be used.

In the present embodiment, as a recording device 214 of the printing unit 210, used is a fiber array recording device that prints the printing data using a fiber array in which laser emitting units of a plurality of optical fibers are arranged in an array in a main-scanning direction (Z-axis direction) orthogonal to a sub-scanning direction (X-axis direction) as the conveying direction of the label film. The fiber array recording device irradiates the label film with the laser beam emitted from the laser light emitting element via the optical fiber array, and prints the printing data in drawing units. As the label film (label), for example, used is a thermal recording medium including a material that absorbs laser beam to be converted into heat (photothermal conversion material) and a material that causes a hue and reflectivity to be changed by heat.

Specifically, the recording device 214 includes a laser array unit 214a, a fiber array unit 214b, and an optical unit 243. The laser array unit 214a includes a plurality of laser light emitting elements 241 arranged in an array, a cooling unit 250 that cools the laser light emitting elements 241, a plurality of driving drivers 245 that are arranged corresponding to the respective laser light emitting elements 241 for driving the respective laser light emitting elements 241, and a controller 246 that controls the driving drivers 245. To the controller 246, connected are a power supply 248 for supplying electric power to the laser light emitting elements 241, and an image information output unit 247 such as a PC that outputs the printing data.

The laser light emitting element 241 can be appropriately selected in accordance with a purpose. For example, a semiconductor laser, a solid-state laser, and a dye laser can be used. Among these, the semiconductor laser is preferred because a wavelength can be selected in a wide range, a device size can be reduced due to a small size of the semiconductor laser, and a price can be reduced.

The wavelength of the laser beam emitted by the laser light emitting element 241 is not specifically limited, and can be appropriately selected in accordance with a purpose.

The wavelength is preferably in a range from 700 nm to 2,000 nm, and more preferably, in a range from 780 nm to 1,600 nm.

The cooling unit 250 uses a liquid cooling method of circulating a coolant to cool the laser light emitting element 241, and includes a heat receiving unit 251 by which the coolant receives heat from each laser light emitting element 241 and a heat emitting unit 252 that emits heat of the coolant. The heat receiving unit 251 and the heat emitting unit 252 are connected to each other via cooling pipes 253a and 253b. In the heat receiving unit 251, a cooling pipe made of a good heat conductive member in which the coolant flows is arranged within a case made of a good heat conductive member. The laser light emitting elements 241 are arranged in an array in the heat receiving unit 251.

The heat emitting unit 252 includes a radiator and a pump for circulating the coolant. The coolant sent out through the pump of the heat emitting unit 252 passes through the cooling pipe 253a to flow into the heat receiving unit 251. The coolant draws heat from the laser light emitting element 241 arranged in the heat receiving unit 251 to cool the laser light emitting element 241 while moving through the cooling pipe in the heat receiving unit 251. The coolant, which is flowed out from the heat receiving unit 251, the temperature of which is raised by drawing heat from the laser light emitting element 241 moves through the cooling pipe 253b, and flows into the radiator of the heat emitting unit 252 to be cooled by the radiator. The coolant cooled by the radiator is sent out again to the heat receiving unit 251 by the pump.

The fiber array unit 214b includes a plurality of optical fibers 242 arranged corresponding to the laser light emitting element 241, and an array head 244 that holds the optical fibers 242 in an array in the vertical direction (Z-axis direction) in the vicinity of the laser emitting unit 242a. A laser incident unit of each optical fiber 242 is attached to a laser emitting surface of the corresponding laser light emitting element 241.

The optical fiber 242 is a light guide of a laser beam emitted from the laser light emitting element 241. The shape, the size (diameter), the material, the structure, and the like of the optical fiber 242 are not specifically limited, and can be appropriately selected in accordance with a purpose.

The size (diameter) of the optical fiber 242 is preferably equal to or larger than 15 μm and equal to or smaller than 1,000 μm. The material of the optical fiber 242 is not specifically limited, and can be appropriately selected in accordance with a purpose. Examples of the material of the optical fiber 242 include glass, resin, and quartz. The optical fiber 242 preferably has a structure including a core part at a center part for passing the laser beam and a cladding layer arranged on an outer circumference of the core part.

The diameter of the core part is not specifically limited, and can be appropriately selected in accordance with a purpose. The diameter of the core part is preferably equal to or larger than 10 μm and equal to or smaller than 500 μm. The material of the core part is not specifically limited, and can be appropriately selected in accordance with a purpose. Examples of the material of the core part include glass doped with germanium or phosphor.

An average thickness of the cladding layer is not specifically limited, and can be appropriately selected in accordance with a purpose. The average thickness of the cladding layer is preferably equal to or larger than 10 μm and equal to or smaller than 250 μm. The material of the cladding layer is not specifically limited, and can be appropriately selected in accordance with a purpose. Examples of the material of the cladding layer include glass doped with boron or fluorine.

In the present embodiment, for example, the optical fibers 242 are held by the array head 244 in an array in the vicinity of the laser emitting unit 242a so that a pitch of the laser emitting unit 242a of the optical fiber 242 is 130 μm. The pitch of the laser emitting unit 242a is set to be 130 μm so that an image with a resolution of 200 dpi can be recorded.

To hold all the optical fibers 242 by one array head 244, the array head 244 becomes long and tends to be easily deformed. As a result, it is difficult to maintain linearity of a beam arrangement and uniformity of a beam pitch. Thus, it is preferable that the array head 244 holds 100 to 200 optical fibers 242, and a plurality of array heads 244 each holding 100 to 200 optical fibers 242 are arranged side by side in the Z-axis direction orthogonal to the conveying direction (X-axis direction) of the label film. In the present embodiment, 200 array heads 244 are arranged side by side in the Z-axis direction.

The optical unit 243 includes a collimator lens 243a that converts a laser beam of a divergent luminous flux emitted from each optical fiber 242 into a parallel luminous flux, and a condenser lens 243b that condenses a laser beam onto a surface of a label film L serving as a laser irradiation surface. Whether to arrange the optical unit 243 may be appropriately determined in accordance with a purpose.

The printing data is input to the controller 246 from the image information output unit 247 such as a PC. The controller 246 generates a drive signal for driving each driving driver 245 based on the input printing data, and transmits the generated drive signal to each driving driver 245. Specifically, the controller 246 includes a clock generator. When the number of clocks oscillated by the clock generator becomes a predetermined number of clocks, the controller 246 transmits the drive signal for driving each driving driver 245 to each driving driver 245.

When receiving the drive signal, each driving driver 245 drives the corresponding laser light emitting element 241, and a laser is emitted from the laser light emitting element 241. The laser emitted from the laser light emitting element 241 is incident on the corresponding optical fiber 242, and emitted from the laser emitting unit 242a of the optical fiber 242. The laser beam emitted from the laser emitting unit 242a of the optical fiber is transmitted through the collimator lens 243a and the condenser lens 243b of the optical unit 243, and emitted onto the surface of the label film L. The label film L is heated by the laser beam emitted onto the surface of the label film L, and the printing data is printed.

In a case of using a recording device that prints printing data on a recording medium such as a label film by changing the laser using a galvanometer mirror, an image such as a character is recorded by emitting the laser beam so as to draw the image with a single stroke through rotation of the galvanometer mirror. Thus, in a case of recording a certain amount of information on the label film, there is a failure such that recording is belated unless conveyance of the label film is stopped.

On the other hand, like the recording device 214 according to the present embodiment, by using the laser array unit 214a in which a plurality of laser light emitting elements 241 are arranged in an array, the printing data can be printed on the label film through ON/OFF control of the laser light emitting element 241 corresponding to each pixel. Due to this, the printing data can be printed without stopping conveyance of the label film even when the amount of information is large. Thus, in a case of printing a large amount of information on the label film, the printing data can be printed without reducing productivity.

The recording device prints the printing data on the label film by heating the label film with a laser, so that a laser with certain high power needs to be used as the laser light emitting element 241. Thus, a heat generation amount of the laser light emitting element 241 is large. In the laser array recording device not including the fiber array unit 214b, the laser light emitting elements 241 needs to be arranged in an array at intervals corresponding to the resolution. Accordingly, to obtain the resolution of 200 dpi, the laser light emitting elements 241 are arranged at very small pitches.

As a result, heat of the laser light emitting element 241 hardly escapes, and the temperature of the laser light emitting element 241 becomes high. When the temperature of the laser light emitting element 241 becomes high, a wavelength and an optical output of the laser light emitting element 241 are varied, and the label film cannot be heated up to a predetermined temperature, so that a favorable image cannot be obtained. To suppress increase in the temperature of the laser light emitting element 241 as described above, a conveying speed of the label film needs to be reduced and a light emission interval of the laser light emitting element 241 needs to be lengthened, so that productivity cannot be sufficiently improved.

In contrast, in the present embodiment, the fiber array recording device includes the fiber array unit 214b. When the fiber array recording device is used, the laser emitting units 242a of the fiber array may be arranged at pitches corresponding to the resolution, and a pitch between the laser light emitting elements of the laser array unit 214a is not necessarily caused to correspond to image resolution. Accordingly, the pitch between the laser light emitting elements can be sufficiently widened so that heat of the laser light emitting element 241 can be sufficiently radiated. Accordingly, the temperature of the laser light emitting element 241 can be prevented from becoming high, the wavelength and the optical output of the laser light emitting element 241 can be prevented from varying, the conveying speed of the label film can be increased, and the productivity can be improved.

In the present embodiment, by arranging the cooling unit 250 to liquid-cool the laser light emitting element 241, increase in the temperature of the laser light emitting element 241 can be further suppressed. As a result, the light emission interval of the laser light emitting element 241 can be further shortened, the conveying speed of the label film can be increased, and the productivity can be improved. Although the laser light emitting element 241 is liquid-cooled in the present embodiment, the laser light emitting element 241 may be air-cooled by using a cooling fan and the like. Cooling efficiency of liquid cooling is higher than that of air cooling, so that the laser light emitting element 241 can be favorably cooled by liquid cooling. On the other hand, the laser light emitting element 241 can be cooled at low cost by air cooling although a cooling effect is weakened.

As described above, in the present embodiment, the printing data is printed on the label film through laser irradiation, but the printing method is not limited thereto. For example, the printing data may be printed on the label film using an ink jet system.

Returning to FIG. 5, the recording management unit 112 records, in the storage unit 150, the printing state information in which the printing order of the printing data created by the printing order creation unit 113 is associated with the printing state based on the printing result of the printing data. After transmitting the printing data to the printing information management unit 114, the recording management unit 112 sends out the printing data to the inspection information management unit 115 in accordance with the printing order.

When receiving the printing data in accordance with the printing order, the inspection information management unit 115 transmits the printing data to the inspection unit 120 in an unchanged order. The inspection information management unit 115 then receives, from the inspection unit 120, an inspection result determining whether the printing data is normally printed, and sends out the inspection result to the recording management unit 112.

The inspection unit 120 receives, from the reading device 300, a read image obtained by reading an image in which the printing data is printed on the label film in accordance with the printing order.

The following describes the reading device 300. The reading device 300 is a device that reads an image and the like of the label film printed by the printing unit 210, and transmits the image to the inspection unit 120. The reading device 300 reads the image printed on the label film by using, for example, a line sensor, but the embodiment is not limited thereto.

The inspection unit 120 compares the read image received from the reading device 300 with the printing data in accordance with the printing order received from the recording management unit 112 to perform inspection of determining whether the read image matches with the printing data. For example, the inspection unit 120 converts any one of or both of the read image and the printing data into inspectable data. The inspection unit 120 counts the number of pixels in which a difference in a pixel value exceeds a predetermined value among corresponding pixels between the converted read image and printing data. If a ratio of the number of counted pixels to the total number of pixels exceeds a reference value, the inspection unit 120 determines that the read image does not match with the printing data, and determines that it is a printing defect or that different printing data is printed.

In this case, the inspection unit 120 determines matching by comparing pixel values between the read image and the printing data, but the embodiment is not limited thereto. Matching may be determined using another inspection method. The inspection unit 120 transmits the inspection result to the recording management unit 112 via the inspection information management unit 115.

The recording management unit 112 associates the printing order of the printing data created by the printing order creation unit 113 with the printing state based on the inspection result obtained by the inspection unit 120, and records the associated information as the printing state information in the storage unit 150. When the printing data is printed by the printing unit 210 or inspection is performed by the inspection unit 120, the recording management unit 112 updates the printing state based on at least one of the printing result received from the printing unit 210 and the inspection result received from the inspection unit 120.

The following describes the printing state information with reference to FIG. 7. For example, in a lower figure of FIG. 7, the printing data is sequentially printed in accordance with the printing order to be inspected thereafter. In the printing state of FIG. 7, the inspection result is received for pieces of printing data of the first to the fourth of the printing order, so that "(inspection) OK" or "(inspection) NG" is recorded each therefor. For pieces of printing data of the fifth and the sixth of the printing order, inspection is not performed but the printing result indicating that printing is completed is received, so that "completed" is recorded. For the printing data of the seventh of the printing order, inspection and printing are not performed but the printing data is transmitted to the printing unit 210, so that "during" is recorded. For pieces of printing data of the eighth to the tenth of the printing order, inspection and printing are not performed and the printing data is not transmitted to the printing unit 210, so that "before" is recorded. In this way, the printing state information is recorded in accordance with the printing state of the printing data.

The recording management unit 112 sends out, to the transmission unit 116, the printing state information in which the printing order is associated with the printing state at a predetermined timing. If the inspection result is "inspection NG", the recording management unit 112 sends out the printing data of "inspection NG" and the number of pieces of the printing data to the printing order creation unit 113, and reprints the printing data.

The transmission unit 116 transmits, to the label winding device 400 that attaches the label onto the bottle, the printing state information in which the printing order is associated with the printing state based on at least one of the printing result of the printing data and the inspection result obtained by the inspection unit 120.

The following describes a procedure of printing and inspection of the printing data using the printing order with reference to the drawings. FIGS. 9-1 and 9-2 are diagrams illustrating a procedure of printing and inspection of the printing data using the printing order.

FIG. 9-1 illustrates a state in which the printing data of the second of the printing order is being printed. The printing data of the first of the printing order has been completely printed, and is being conveyed toward the reading device 300. FIG. 9-2 illustrates a state in which the label film on which the printing data of the second of the printing order is printed is read to inspect whether the read image matches with the printing data, and the printing data of the fifth of the printing order is being printed. In this way, printing and inspection of the printing data are performed like a flow operation.

Next, the following describes details about the label winding device 400. FIGS. 10-1 and 10-2 are configuration diagrams of the label winding device according to the first embodiment. FIG. 11 is a functional block diagram illustrating a configuration of the label winding device according to the first embodiment.

The label winding device 400 according to the present embodiment refers to the printing state information received from the management device 100, and winds the label around the bottle to be attached, the label corresponding to a result of "inspection OK" (first inspection result) indicating that the read image matches with the printing data. The label winding device 400 does not attach, onto the bottle, the label corresponding to a result of "inspection NG" (second inspection result) indicating that the read image does not match with the printing data.

As illustrated in FIGS. 10-1 and 10-2, the label winding device 400 includes a label supplying unit 432, bottle conveying units 433a to 433d, a bottle charge control member 434, a label cutting member 435, a label attaching member 436, and a bottle discharge control member 437. In FIGS. 10-1 and 10-2, a reference sign B denotes the bottle.

The label supplying unit 432 is a device that conveys the label film on which the printing data is printed by the printing device 200 toward the label cutting member 435 to supply the label film to the label winding device 400.

The bottle conveying units 433a to 433d are devices that convey the bottle. Specifically, first, the bottle is conveyed by the bottle conveying unit 433a having a linear shape, and the bottle is charged into the bottle conveying unit 433b. The bottle conveying unit 433b conveys the bottle in a counterclockwise direction along a circular shape, and passes the bottle to the bottle conveying unit 433c. The bottle conveying unit 433c conveys the bottle in a clockwise direction along a circular shape larger than the bottle conveying unit 433b, and passes the bottle to the bottle conveying unit 433d. The label is wound around the bottle while the bottle is conveyed by the bottle conveying unit 433c. Next, the bottle conveying unit 433d conveys the bottle in a counterclockwise direction along a circular shape equivalent to the bottle conveying unit 433c, and passes the bottle to the bottle conveying unit 433a. The bottle conveying unit 433a then conveys the bottle to be discharged.

The bottle charge control member 434 is a member of switching between a state in which the bottle can be charged into the bottle conveying unit 433b from the bottle conveying unit 433a, and a state in which the bottle cannot be charged into the bottle conveying unit 433b from the bottle conveying unit 433a.

The label cutting member 435 is a device that cuts the conveyed label film into a label to be attached on each bottle. When cutting the label on which the printing data is not normally printed (the "inspection NG" label L1 in FIG. 10-2), the label cutting member 435 directly puts the label into a disposal box and the like to be discarded.

The label attaching member 436 is a device that attaches, onto the bottle, the label on which the printing data is normally printed. Any attachment method can be applied. For example, the label is attached by winding the label around the bottle and overlapping both ends of the label to be press-fitted to each other by heat.

The bottle discharge control member 437 is a member that switches between a state in which the bottle can be discharged to the bottle conveying unit 433d from the bottle conveying unit 433c, and a state in which the bottle is conveyed again by the bottle conveying unit 433c to be recharged.

As illustrated in FIG. 11, the label winding management unit 410 included in the label winding device 400 includes a reception unit 411, a label supply control unit 412, a conveyance control unit 413, a bottle charge determining unit 414, a label cutting control unit 415, a label attachment control unit 416, and a bottle discharge determining unit 417.

After printing and inspection of the printing data are completed, the reception unit 411 receives the printing state information from the management device 100.

The label supply control unit 412 supplies the label film to the label winding device 400 by controlling the label supplying unit 432 to convey the label film on which the printing data is printed toward the label cutting member 435.

The conveyance control unit 413 controls conveyance of the bottle by the bottle conveying units 433a to 433d. That is, the conveyance control unit 413 conveys the bottle by moving the bottle conveying unit 433a by the conveyance motor 45 (refer to FIG. 4) to rotate the bottle conveying units 433b to 433d. The conveyance control unit 413 can grasp which number of bottle is conveyed by detecting the bottle by the bottle sensor 46 (refer to FIG. 4) arranged at a predetermined position.

The bottle charge determining unit 414 controls the bottle charge control member 434 to be switched between a state in which the bottle can be charged into the bottle conveying unit 433*b* from the bottle conveying unit 433*a*, and a state in which the bottle cannot be charged into the bottle conveying unit 433*b* from the bottle conveying unit 433*a*.

Specifically, the bottle charge determining unit 414 refers to the received printing state information, and if the printing state is "inspection NG", the bottle charge determining unit 414 controls the bottle charge control member 434 not to charge the bottle into a holder of the bottle conveying unit 433*b* corresponding to a position at which the bottle onto which the label is not attached by the label attaching member 436 (unlabeled bottle) is recharged into the bottle conveying unit 433*c*. The bottle charge determining unit 414 refers to the received printing state information, and if the printing state is "inspection OK", the bottle charge determining unit 414 controls the bottle charge control member 434 to cause the bottle conveying unit 433*b* to successively convey the bottle.

For example, when one of the bottles is not charged, the bottle charge determining unit 414 performs control to stop conveyance of the bottle by inserting the bottle charge control member 434 before the bottle not to be conveyed, and performs control to recharge the bottle into the bottle conveying unit 433*b* by pulling out the bottle charge control member 434 when the holder of the bottle conveying unit 433*b* rotates by an amount corresponding to one bottle.

The label cutting control unit 415 controls the label cutting member 435 to cut the label film wound in a roll shape into units of being attached onto the bottle. The label cutting control unit 415 refers to the received printing state information, and cuts and discards the label of "inspection NG" (second inspection result) on which the printing data is not normally printed. On the other hand, the label cutting control unit 415 refers to the received printing state information, cuts the label of "inspection OK" (first inspection result) on which the printing data is normally printed, and passes the label to the label attaching member 436.

The label attachment control unit 416 refers to the received printing state information, and controls the label attaching member 436 to wind the label of "inspection OK" around the bottle to be attached. The label attachment control unit 416 refers to the received printing state information, and controls the label attaching member 436 not to receive the label of "inspection NG" from the label cutting member 435. As a result, the label is not attached onto the bottle.

The bottle discharge determining unit 417 controls the bottle discharge control member 437 to be switched between a state in which the bottle can be discharged to the bottle conveying unit 433*d* from the bottle conveying unit 433*c*, and a state in which the bottle is conveyed again by the bottle conveying unit 433*c* to be recharged.

Specifically, the bottle discharge determining unit 417 refers to the received printing state information, and controls the bottle discharge control member 437 to discharge the bottle by passing the bottle onto which the label is attached by the label attaching member 436 to the bottle conveying unit 433*d* from the bottle conveying unit 433*c*. The bottle discharge determining unit 417 refers to the received printing information, and controls the bottle discharge control member 437 to recharge the bottle onto which the label is not attached by the label attaching member 436 (unlabeled bottle) into the bottle conveying unit 433*c*, and to convey the bottle.

For example, as illustrated in FIG. 10-1, the bottle discharge determining unit 417 causes the bottle to be discharged by controlling the bottle discharge control member 437 to be arranged at a position blocking a conveyance path of the bottle conveying unit 433*c*. As illustrated in FIG. 10-2, the bottle discharge determining unit 417 causes the bottle to be recharged into the bottle conveying unit 433*c* by controlling the bottle discharge control member 437 to be arranged at a position guiding the conveyance path of the bottle conveying unit 433*c*.

In the present embodiment, the bottle charge determining unit 414 controls the bottle charge control member 434 based on the received printing state information, and the bottle discharge determining unit 417 controls the bottle discharge control member 437 also based on the printing state information. Alternatively, another configuration may be employed.

That is, the bottle charge determining unit 414 may receive information indicating whether the label is attached onto the bottle from the label attachment control unit 416, and may control the bottle charge control member 434 based on the information. Similarly, the bottle discharge determining unit 417 may receive information indicating whether the label is attached onto the bottle from the label attachment control unit 416, and may control the bottle discharge control member 437 based on the information.

Next, the following describes a procedure of transmission processing of the printing state information performed by the management device 100 according to the present embodiment. FIG. 12 is a flowchart illustrating a procedure of transmission processing of the printing state information performed by the management device according to the first embodiment.

First, the input reception unit 111 receives, from the user, inputs of the printing data and the number of pieces of printing data to be printed (Step S10). The recording management unit 112 generates input data in which the received printing data is associated with the number of pieces of printing data to be printed, records the input data in the storage unit 150, and sends out the input data to the printing order creation unit 113 (Step S11).

The printing order creation unit 113 refers to the received input data, creates a printing order of the printing data to be printed based on the printing data and the number of pieces of printing data to be printed, and sends out the printing order to the recording management unit 112 (Step S12).

The recording management unit 112 generates the printing state information in which the received printing order is associated with the printing state of the printing data, and records the printing state information in the storage unit 150 (Step S13). The recording management unit 112 then sends out the printing data selected in accordance with the printing order to the printing information management unit 114, and updates the printing state to be "during (during printing)" (Step S14).

When the printing information management unit 114 transmits the printing data to the printing unit 210 and the printing data is printed on the label film by the printing unit 210, the printing information management unit 114 sends out, to the recording management unit 112, a printing result indicating that printing is completed received from the printing unit 210. The recording management unit 112 receives the printing result, and updates the printing state to be "completed (printing completed)" (Step S15).

The recording management unit 112 transmits the printing data in accordance with the printing order to the inspection unit 120 via the inspection information management unit 115. On the other hand, the reading device 300 transmits, to the inspection unit 120, a read image obtained by reading the label film on which the printing data is printed. The inspection unit 120 receives the printing data, and receives the read image obtained by reading the label film (Step S16). The inspection unit 120 compares the printing data with the read image to inspect whether they match with each other (Step S17). The inspection unit 120 transmits the inspection result to the recording management unit 112 via the inspection information management unit 115.

The recording management unit 112 receives the inspection result, and updates the printing state to be "inspection OK" or "inspection NG" based on the inspection result (Step S18). The recording management unit 112 sends out the printing state information to the transmission unit 116, and the transmission unit 116 transmits the printing state information to the label winding device 400 (Step S19).

The recording management unit 112 refers to the inspection result, and determines whether the inspection result is "inspection NG" (Step S20). If the inspection result is not "inspection NG", that is, the inspection result is "inspection OK" (No at Step S20), the label on which the printing data is printed is attached onto the bottle. On the other hand, if the inspection result is "inspection NG" (Yes at Step S20), the recording management unit 112 sends out, to the printing order creation unit 113, the printing data of "inspection NG" and the number of pieces thereof, repeats processing following Step S12, and reprints the printing data.

Next, the following describes a processing procedure of winding the label around the bottle to be attached performed by the label winding device 400 according to the present embodiment. FIG. 13 is a flowchart illustrating a procedure of attaching the label performed by the label winding device according to the first embodiment.

First, the label supply control unit 412 controls the label supplying unit 432 to supply the label film on which the printing data is printed (Step S30). The conveyance control unit 413 controls the bottle conveying units 433a to 433d to convey the bottle (Step S31).

The reception unit 411 receives the printing state information from the management device 100 (Step S32). The label cutting control unit 415 refers to the printing state of the received printing state information, and determines whether the printing data is unsuccessfully printed. That is, the label cutting control unit 415 determines whether the printing state is "inspection OK" or "inspection NG" (Step S33).

If the printing state is "inspection NG" and the printing data is unsuccessfully printed (Yes at Step S33), the label cutting control unit 415 causes the label cutting member 435 to cut the label on which the printing data is unsuccessfully printed, and discards the label (Step S34). The label attachment control unit 416 does not attach the label onto the bottle (Step S35).

The bottle charge determining unit 414 controls the bottle charge control member 434 not to charge the bottle into a holder of the bottle conveying unit 433c at a position at which the bottle onto which the label is not attached (unlabeled bottle) is recharged (Step S36).

The bottle discharge determining unit 417 controls the bottle discharge control member 437 to recharge the bottle onto which the label is not attached into the bottle conveying unit 433c (Step S37).

On the other hand, at Step S33, if the printing state is "inspection OK" and the printing data is successfully printed (No at Step S33), the label cutting control unit 415 causes the label cutting member 435 to cut the label on which the printing data is successfully printed (Step S38). The label attachment control unit 416 causes the label attaching member 436 to attach the label onto the bottle (Step S39).

The bottle discharge determining unit 417 controls the bottle discharge control member 437 to discharge the bottle, onto which the label is attached, to the bottle conveying unit 433d (Step S40).

The label cutting control unit 415 determines whether the label is attached onto all of a predetermined number of bottles (Step S41). If the label is not attached onto all the bottles (No at Step S41), the process returns to Step S33 to be repeated. On the other hand, if the label is attached onto all the bottles (Yes at Step S41), the process is ended.

In this way, in the label attachment system 1 according to the first embodiment, the label is wound around the bottle to be attached after the printing data is printed on the label. The label attachment system 1 compares the printing data with the read image read from the label after the printing data is printed to inspect matching therebetween, and determines whether desired content is printed on the label. If desired content is not printed, the label is discarded and the printing data having the same content is reprinted. Thus, the label attachment system 1 prints the printing data on the label and attaches the label onto the bottle, so that labels (media) are not required to be held as stocks, and time until the printing content is changed and printed can be shortened even when the printing content is variable. Even when there is a label on which desired content is not printed, the label can be specified by comparing the read image with the printing data to be inspected based on the printing order, so that printing data having the same content can be reprinted.

With the management device 100 according to the present embodiment, even when the label winding management unit 410 of the label winding device 400 does not recognize an operation or a result of the reading device 300 and the printing device 200, the label winding management unit 410 can securely manage the label due to the state information transmitted from the management device 100.

Second Embodiment

In the label winding device according to the first embodiment, if there is a label the inspection result of which is "inspection NG", the label is discarded and not attached onto the bottle. Then an unlabeled bottle is recharged. In contrast, if there is a label the inspection result of which is "inspection NG", the label winding device according to the second embodiment does not charge the bottle into a position of the bottle onto which the label is attached.

FIG. 14 is an entire configuration diagram of a label attachment system according to the second embodiment. In a label attachment system 2 illustrated in FIG. 14, the management device 100, the printing device 200, the reading device 300, and a label winding device 500 are connected to each other via a network.

The management device 100, the printing device 200, and the reading device 300 are the same as those in the first embodiment, so that the description thereof will be omitted. The hardware configurations of the management device 100 and the printing device 200 are the same as those in the first embodiment, so that the description thereof will be omitted. The hardware configuration of the label winding device 500 is the same as the hardware configuration of the label winding device 400 (refer to FIG. 4).

The label winding device 500 is a device that winds the label around the bottle to be attached, the label on which the printing data is printed by the printing device 200 and the inspection result of which is determined to be normal by the inspection unit 120. The label winding device 500 includes a label winding management unit 510 that controls winding of the label.

Next, the following describes details about the label winding device 500. FIGS. 15-1 and 15-2 are configuration diagrams of the label winding device according to the second embodiment. FIG. 16 is a functional block diagram illustrating a configuration of the label winding device according to the second embodiment.

The label winding device 500 according to the present embodiment refers to the printing state information received from the management device 100, and winds the label around the bottle to be attached, the label corresponding to a result of "inspection OK" (first inspection result) indicating that the read image matches with the printing data. The label winding device 500 does not attach, onto the bottle, the label corresponding to a result of "inspection NG" (second inspection result) indicating that the read image does not match with the printing data. Although the label winding device 400 according to the first embodiment is configured not to attach the label of "inspection NG" onto the conveyed bottle, the label winding device 500 according to the present embodiment is configured not to convey the bottle corresponding to the label of "inspection NG".

As illustrated in FIGS. 15-1 and 15-2, the label winding device 500 includes the label supplying unit 432, the bottle conveying units 433a to 433d, the bottle charge control member 434, the label cutting member 435, and the label attaching member 436. The functions thereof are the same as those of the label winding device 400 according to the first embodiment, so that the description thereof will be omitted. The label winding device 500 according to the present embodiment does not determine whether to recharge or discharge the bottle, so that the label winding device 500 does not include the bottle discharge control member 437. In FIGS. 15-1 and 15-2, the reference sign B denotes the bottle.

As illustrated in FIG. 16, the label winding management unit 510 included in the label winding device 500 includes the reception unit 411, the label supply control unit 412, the conveyance control unit 413, a bottle charge determining unit 514, the label cutting control unit 415, and the label attachment control unit 416. Herein, the functions of the components other than the bottle charge determining unit 514 are the same as those in the first embodiment, so that the description thereof will be omitted.

The bottle charge determining unit 514 controls the bottle charge control member 434 to be switched between a state in which the bottle can be charged into the bottle conveying unit 433b from the bottle conveying unit 433a, and a state in which the bottle cannot be charged into the bottle conveying unit 433b from the bottle conveying unit 433a.

Specifically, the bottle charge determining unit 514 refers to the received printing state information, and controls the bottle charge control member 434 not to charge the bottle into a holder of the bottle conveying unit 433c corresponding to a position at which the label corresponding to a result that the printing state is "inspection NG" is attached. The bottle charge determining unit 514 refers to the received printing state information, and causes the bottle to be charged into a holder of the bottle conveying unit 433c corresponding to a position at which the label corresponding to a result that the printing state is "inspection OK" is attached. A method of controlling the bottle charge control member 434 is the same as that in the first embodiment.

Next, the following describes a processing procedure of winding the label around the bottle to be attached performed by the label winding device 500 according to the present embodiment. FIG. 17 is a flowchart illustrating a procedure of attaching the label performed by the label winding device according to the second embodiment. The procedure of transmission processing of the printing state information performed by the management device 100 is the same as that in the first embodiment, so that the description thereof will be omitted (refer to FIG. 12).

First, the label supply control unit 412 controls the label supplying unit 432 to supply the label film on which the printing data is printed (Step S50). The conveyance control unit 413 controls the bottle conveying units 433a to 433d to convey the bottle (Step S51).

The reception unit 411 receives the printing state information from the management device 100 (Step S52). The label cutting control unit 415 refers to the printing state of the received printing state information, and determines whether the printing data is unsuccessfully printed. That is, the label cutting control unit 415 determines whether the printing state is "inspection OK" or "inspection NG" (Step S53).

If the printing state is "inspection NG" and if the printing data is unsuccessfully printed (Yes at Step S53), the label cutting control unit 415 causes the label cutting member 435 to cut the label on which the printing data is unsuccessfully printed, and discards the label (Step S54).

The bottle charge determining unit 514 refers to the received printing state information, and controls the bottle charge control member 434 not to charge the bottle into a holder of the bottle conveying unit 433c corresponding to a position at which the label on which the printing data is unsuccessfully printed is attached (Step S55). The bottle is not charged and the label is discarded, so that the label attachment control unit 416 does not attach the label onto the bottle (Step S56).

On the other hand, at Step S53, if the printing state is "inspection OK" and the printing data is successfully printed (No at Step S53), the label cutting control unit 415 causes the label cutting member 435 to cut the label on which the printing data is successfully printed (Step S57). The label attachment control unit 416 causes the label attaching member 436 to attach the label onto the bottle (Step S58). The conveyance control unit 413 conveys the bottle onto which the label is attached, and discharges the bottle to the bottle conveying unit 433d (Step S59).

The label cutting control unit 415 determines whether the label is attached onto all of a predetermined number of bottles (Step S60). If the label is not attached onto all the bottles (No at Step S60), the process returns to Step S53 to be repeated. On the other hand, if the label is attached onto all the bottles (Yes at Step S60), the process is ended.

In this way, in the label attachment system 2 according to the second embodiment, the label is wound around the bottle to be attached after the printing data is printed on the label. The label attachment system 2 compares the printing data with the read image read from the label after the printing data is printed to inspect matching therebetween, and determines whether desired content is printed on the label. If desired content is not printed, the label is discarded and the printing data having the same content is reprinted. Thus, the label attachment system 2 prints the printing data on the label and attaches the label onto the bottle, so that labels (media) are not required to be held as stocks, and time until the printing content is changed and printed can be shortened even when the printing content is variable. Even when there is a label on which desired content is not printed, the label can be specified by comparing the read image with the printing data to be inspected based on the printing order, so that printing data having the same content can be reprinted.

In the label winding device 500 of the label attachment system 2 according to the second embodiment, the bottle is not charged into a holder at a position to which the bottle is conveyed, the bottle onto which the label the printing state of which is "inspection NG" is attached, so that it is sufficient that whether to charge the bottle is determined only when the bottle is to be charged, and it is not required to determine whether to discharge the bottle at the time when the bottle is to be discharged. Accordingly, the label on which printing is successfully performed can be attached onto the bottle with a simpler configuration.

The label attachment systems 1 and 2 according to the first and second embodiments described above have a configuration of "Roll To Bottle" in which the label film is not wound in a roll shape to be attached onto the bottle as it is after the printing data is printed thereon. The label attachment systems 1 and 2 have an in-line configuration in which printing processing on the label film extracted from the roll 60, inspection processing on the printed label film, attachment of the label on the bottle, and processing accompanying therewith are automated as a series of processes. In a case of the in-line configuration, a page position required for each process can be relatively represented, so that management of the roll 60 is not required after the printing data is printed.

With the management device 100 according to the present embodiment, even when the label winding management unit 510 of the label winding device 500 does not recognize an operation or a result of the reading device 300 and the printing device 200, the label winding management unit 510 can securely manage the label due to the state information transmitted from the management device 100.

Third Embodiment

In the label attachment system according to the first and the second embodiments, the label film on which the printing data is printed is read by the reading device 300 as an image, conveyed to the label winding device as it is, and the label is attached onto the bottle. In contrast, in a label attachment system according to a third embodiment, the label film on which the printing data is printed is read as an image by the reading device 300, and temporarily wound in a roll shape. The label film is conveyed to the label winding device at a predetermined timing, and the label is attached onto the bottle.

FIG. 18 is an entire configuration diagram of the label attachment system according to the third embodiment. In a label attachment system 3 illustrated in FIG. 18, the management device 100, the printing device 200, the reading device 300, a roll control device 600, and the label winding device 500 are connected to each other via a network. FIG. 19 is a hardware configuration diagram of the roll control device 600 according to the third embodiment. As illustrated in FIG. 19, the roll control device 600 has a hardware configuration similar to that of the management device 100 illustrated in FIG. 2. In FIG. 19, the same hardware configuration as that of the management device 100 illustrated in FIG. 2 is denoted by the same reference numeral, and the description thereof will be omitted. The roll control device 600 includes a conveying mechanism 601 that conveys the label film.

The management device 100, the printing device 200, the reading device 300, and the label winding device 500 are the same as those in the second embodiment, so that the description thereof will be omitted. The management device 100, the printing device 200, and the label winding device 500 has the same hardware configuration as that in the first embodiment, so that the description thereof will be omitted.

The roll control device 600 is a device that causes a roll around which the label film is wound to temporarily stand by, the label film on which the printing data is printed by the printing device 200 to be read as an image by the reading device 300, and sends out the label film to the label winding device 500 at a predetermined timing.

Next, the following describes details about the roll control device 600. FIGS. 20-1 and 20-2 are configuration diagrams of the roll control device according to the third embodiment. FIG. 21 is a functional block diagram illustrating a configuration of the roll control device according to the third embodiment.

As illustrated in FIGS. 20-1 and 20-2, the roll control device 600 includes a first roll unit 651, a second roll unit 652, a storage unit 620, and a roll management unit 610.

The first roll unit 651 is a member around which the label film before the printing data is printed is wound in a roll shape to be held. The second roll unit 652 is a member around which the label film after the printing data is printed is wound in a roll shape to be held.

The storage unit 620 stores various pieces of information about the roll obtained by winding the label film in a roll shape, and is implemented by a ROM 12 or the HDD 15 (refer to FIG. 19). Specifically, in the present embodiment, the storage unit 620 stores roll information in which the printing state information corresponding to the roll is associated with a roll ID (an example of roll identification information) for identifying the roll as a roll-shaped label film wound around the second roll unit 652 in a reverse printing order. The roll is an example of the roll medium.

The roll management unit 610 is connected to the printing data management unit 110 and the label winding management unit 510 in a communicable manner. As illustrated in FIG. 21, the roll management unit 610 includes a roll conveyance control unit 611, a communication unit 612, and a roll information management unit 613.

The roll conveyance control unit 611 controls the conveying mechanism 601 to convey the label film to the second roll unit 652 from the first roll unit 651, and wind the label film in a roll shape to be a roll. In this case, the roll conveyance control unit 611 applies a roll ID (roll identification information) for identifying the roll to the roll around which the label film is wound, and sends out the roll ID to the roll information management unit 613.

The roll conveyance control unit 611 controls the conveying mechanism 601 to convey the label film wound around the second roll unit 652 toward the label winding device 500 at a predetermined timing. For example, a driving unit for rotationally driving the first roll unit 651 and the second roll unit 652 is arranged in the conveying mechanism 601. The roll conveyance control unit 611 performs control so that the label film is conveyed by rotating the driving unit to wind or discharge the label film.

The communication unit 612 communicates various pieces of information to/from the management device 100 and the label winding device 500. Specifically, the communication unit 612 receives the printing state information from the management device 100. When the roll conveyance control unit 611 controls the conveying mechanism 601 to convey the label film of the second roll unit 652 to the label winding device 500, the communication unit 612 transmits roll information corresponding to a roll to be conveyed to the label winding device 500 from the storage unit 620.

The roll information management unit 613 generates roll information in which the roll ID for identifying the roll wound around the second roll unit 652 is associated with the printing information corresponding to the label film of the roll wound around the second roll unit 652 in a reverse printing order, and records the generated roll information in the storage unit 620.

Next, the following describes a procedure of conveyance control processing of the label film performed by the roll control device 600 according to the present embodiment. FIG. 22 is a flowchart illustrating a procedure of conveyance control processing of the label film performed by the roll control device according to the third embodiment.

First, the roll conveyance control unit 611 controls the conveying mechanism 601 to convey the label film from the first roll unit 651 to the second roll unit 652 to be wound in a roll shape to be a roll (Step S70). Meanwhile, the printing data is printed on the label film, the reading device 300 reads the label film on which the printing data is printed, and matching between the printing data and the read image is inspected.

Thereafter, the communication unit 612 receives the printing state information from the management device 100 (Step S71). The roll information management unit 613 generates roll information in which the roll ID of the roll wound around the second roll unit 652 is associated with the printing state information corresponding to the label film of the roll wound around the second roll unit 652 in a reverse printing order, and records the generated roll information in the storage unit 620 (Step S72).

The roll conveyance control unit 611 determines whether a predetermined timing has come (Step S73). If the predetermined timing has not come yet (No at Step S73), the roll conveyance control unit 611 stands by until the predetermined timing comes. On the other hand, if the predetermined timing comes (Yes at Step S73), the roll conveyance control unit 611 controls the conveying mechanism 601 to convey the label film from the roll of the second roll unit 652 to the label winding device 500 (Step S74), and the communication unit 612 transmits the roll information to the label winding device 500 (Step S75).

In this way, in the label attachment system 3 according to the third embodiment, the label is wound around the bottle to be attached after the printing data is printed on the label. The label attachment system 3 compares the printing data with the read image read from the label after the printing data is printed to inspect matching therebetween, and determines whether desired content is printed on the label. If desired content is not printed, the label is discarded and the printing data having the same content is reprinted. Thus, the label attachment system 3 prints the printing data on the label and attaches the label onto the bottle, so that labels (media) are not required to be held as stocks, and time until the printing content is changed and printed can be shortened even when the printing content is variable. Even when there is a label on which desired content is not printed, the label can be specified by comparing the read image with the printing data to be inspected based on the printing order, so that printing data having the same content can be reprinted.

In the label attachment system 3 according to the third embodiment, the label film on which the printing data is printed is read as an image by the reading device 300, and temporarily wound in a roll shape. The label film is conveyed to the label winding device 500 at a predetermined timing, and the label is attached onto the bottle. Accordingly, even when a printing process of the printing data on the label film is not synchronized with an attachment process of the label on the bottle (even when both processes cannot be continuously performed), the printing process of the printing data and the attachment process of the label can be performed by the label attachment system 3 by adjusting a timing of conveying the label film from the roll on which the printing data is printed.

The label attachment system 3 according to the third embodiment described above has a configuration of "Roll To Roll" in which the label film is temporarily wound in a roll shape after the printing data is printed. The label attachment system 3 according to the third embodiment has a configuration in which, after the label film on which the printing data is printed is wound, the label film is conveyed to the label winding device 500 at an optional timing. Alternatively, the roll around which the label film is wound may be temporarily stored. That is, specifically, the label attachment system may have an on-line configuration in which the roll around which the label film on which the printing data is printed is wound is temporarily removed from a production line to be kept, stored, and the like, and conveyed to the label winding device at an optional timing to attach the label onto the bottle. In a case of the on-line configuration, although a management process of the roll and an artificial determination process are generated in a keeping or a storing process, the label can be attached onto the bottle at an optional timing without being synchronized with printing processing.

With the management device 100 according to the present embodiment, even when the label winding management unit 510 of the label winding device 500 does not recognize an operation or a result of the reading device 300 or the printing device 200, the label winding management unit 510 can securely manage the label due to the state information transmitted from the management device 100.

In the first to the third embodiments, the printing device 200 including the printing unit 210 is connected to the management device 100. However, the embodiments are not limited thereto. That is, the present invention can be applied to an image forming apparatus including the configuration of the management device 100 and the configuration of the printing device 200. FIG. 23 is a diagram illustrating another example of the entire configuration diagram of the label attachment system. A label attachment system 4 in FIG. 23 includes the management device 100, the printing device 200, and the reading device 300 as an image forming apparatus 1000.

The computer program executed by the management device 100 according to the present embodiments is recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed by the management device 100 according to the present embodiments may be stored in a computer connected to a network such as the Internet and provided by being downloaded via the network. Furthermore, the computer program executed by the management device 100 according to the present embodiments may be provided or distributed via a network such as the Internet. The computer program according to the present embodiments may be embedded and provided in a ROM, for example.

The computer program executed by the management device 100 according to the present embodiment has a module configuration including the components described above (the input reception unit, the recording management unit, the printing order creation unit, the printing information management unit, the inspection information management unit, the transmission unit, and the inspection unit). As actual hardware, the components described above are loaded into a main storage device when a CPU (processor) reads the computer program from the ROM to be executed, and the components are generated on the main storage device. For example, part or all of the functions of the components described above may be implemented with a dedicated hardware circuit.

According to the embodiments, a medium on which desired content is not formed as an image can be detected even when content to be formed as an image on a medium is variable.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A management device comprising:
an image formation data management unit configured to create a formation order indicating an order of forming an image corresponding to image formation data on a medium to be applied to an application target object; and
an inspection unit configured to inspect whether the image formation data in accordance with the formation order matches with a read image obtained by reading the image formed on the medium in accordance with the formation order, wherein
the image formation data management unit transmits state information in which the formation order is associated with an image formation state based on at least one of an image formation result of the image formation data and an inspection result obtained by the inspection unit,
the image formation data management unit comprises:
an input reception unit configured to receive an input of the image formation data and number of pieces of the image formation data to be formed as images;
a recording management unit configured to generate input information in which the image formation data is associated with the number of pieces of the image formation data to be formed as images, and record the input information in a storage unit;
a formation order creation unit configured to create the formation order based on the image formation data and the number of pieces of the image formation data to be formed as images with reference to the input information; and
a transmission unit configured to transmit the state information,
the recording management unit generates the state information and records the generated state information in the storage unit.

2. The management device according to claim 1, wherein the image formation data management unit further comprises:
an image formation information management unit configured to transmit the image formation data in accordance with the formation order to an image forming unit, and receive an image formation result from the image forming unit; and
an inspection information management unit configured to transmit the image formation data in accordance with the formation order to the inspection unit, and receive the inspection result from the inspection unit, wherein
the recording management unit updates the image formation state based on at least one of the image formation result and the inspection result.

3. The management device according to claim 1, wherein the transmission unit transmits the state information to a medium application device that applies the medium to the application target object.

4. An image forming apparatus comprising:
an image formation data management unit configured to create a formation order indicating an order of forming an image corresponding to image formation data on a medium to be applied to an application target object;
an image forming unit configured to form the image corresponding to the image formation data in accordance with the formation order; and
an inspection unit configured to inspect whether the image formation data in accordance with the formation order matches with a read image obtained by reading the images formed on the medium, wherein the image formation data management unit transmits state information in which the formation order is associated with an image formation state based on at least one of an image formation result obtained by the image forming unit and an inspection result obtained by the inspection unit, the image formation data management unit comprises:
   an input reception unit configured to receive an input of the image formation data and number of pieces of the image formation data to be formed as images;
   a recording management unit configured to generate input information in which the image formation data is associated with the number of pieces of the image formation data to be formed as images, and record the input information in a storage unit;
   a formation order creation unit configured to create the formation order based on the image formation data and the number of pieces of the image formation data to be formed as images with reference to the input information; and
   a transmission unit configured to transmit the state information, the recording management unit generates the state information and records the generated state information in the storage unit.

5. A medium application system comprising:
a management device; and
a medium application device connected to the management device via a network, wherein
the management device comprises:
   an image formation data management unit configured to create a formation order indicating an order of forming an image corresponding to image formation data on media to be respectively applied to application target objects; and
   an inspection unit configured to inspect whether the image formation data in accordance with the formation order matches with a read image obtained by reading the image formed on the media in accordance with the formation order, wherein
the image formation data management unit transmits, to the medium application device, state information in which the forming order is associated with an image formation state based on at least one of an image formation result of the image formation data and an inspection result obtained by the inspection unit, and
the medium application device comprises a medium application management unit configured to apply, to an application target object, a medium corresponding to a first inspection result indicating that the read image matches with the image formation data, and configured not to apply, to an application target object, a medium corresponding to a second inspection result indicating that the read image does not match with the image formation data, by referring to the state information received from the management device, the image formation data management unit comprises:
   an input reception unit configured to receive an input of the image formation data and number of pieces of the image formation data to be formed as images;
   a recording management unit configured to generate input information in which the image formation data is associated with the number of pieces of the image formation data to be formed as images, and record the input information in a storage unit;
   a formation order creation unit configured to create the formation order based on the image formation data and the number of pieces of the image formation data to be formed as images with reference to the input information; and
   a transmission unit configured to transmit the state information, the recording management unit generates the state information and records the generated state information in the storage unit.

6. The medium application system according to claim 5, wherein
the medium application management unit comprises:
   a reception unit configured to receive the state information from the management device;
   a conveyance control unit configured to control a conveying unit that conveys the application target objects;
   a medium application control unit configured to apply the medium corresponding to the first inspection result to the application target object, and configured not to apply the medium corresponding to the second inspection result to the application target object, by referring to the state information;
   a discharge determining unit configured to discharge the application target object to which the medium has been applied, and recharge the application target object to which the medium is not applied into the conveying unit; and
   a charge determining unit configured not to charge another application target object into the conveying unit corresponding to a position at which the application target object to which the medium is not applied is recharged.

7. The medium application system according to claim 6, further comprising:
a medium cutting unit configured to cut the media wound in a roll shape into units of being respectively applied to the application target objects, and discard the medium corresponding to the second inspection result.

8. The medium application system according to claim 5, wherein
the medium application management unit comprises:
   a reception unit configured to receive the state information from the management device;
   a conveyance control unit configured to control a conveying unit that conveys the application target objects;
   a charge determining unit configured not to charge an application target object into the conveying unit corresponding to a position at which the medium corresponding to the first inspection result is charged, by referring to the state information; and
   a medium application control unit configured to apply the medium corresponding to the first inspection result to the application target object, and configured not to apply the medium corresponding to the second inspection result to the application target object, by referring to the state information.

9. The medium application system according to claim 5, further comprising:
a medium cutting unit configured to cut the media wound in a roll shape into units of being respectively applied to the application target objects, and discard the medium corresponding to the second inspection result.

10. A medium application system comprising:
a management device;
a roll control device connected to the management device via a network; and
a medium application device connected to the roll control device via a network, wherein
the management device comprises:
an image formation data management unit configured to create a formation order indicating an order of forming an image corresponding to image formation data on a medium; and
an inspection unit configured to inspect whether the image formation data in accordance with the formation order matches with a read image obtained by reading the image formed on the media in accordance with the formation order, wherein
the image formation data management unit transmits, to the roll control device, state information in which the formation order is associated with an image formation state based on at least one of an image formation result of the image formation data and an inspection result obtained by the inspection unit,
the roll control device comprises:
a roll unit around which the media having the image formed thereon is wound to be held; and
a roll management unit configured to receive the state information from the management device, and store, in a storage unit, the state information as roll information corresponding to a roll medium that is the media in a roll shape wound around the roll unit in a reverse formation order, and
the medium application device comprises a medium application control unit configured to apply, to an application target object, a medium corresponding to a first inspection result indicating that the read image matches with the image formation data, and configured not to apply, to an application target object, a medium corresponding to a second inspection result indicating that the read image does not match with the image formation data, by referring to the roll information received from the roll control device in applying the medium to the application target object,
the image formation data management unit comprises:
an input reception unit configured to receive an input of the image formation data and number of pieces of the image formation data to be formed as images;
a recording management unit configured to generate input information in which the image formation data is associated with the number of pieces of the image formation data to be formed as images, and record the input information in a storage unit;
a formation order creation unit configured to create the formation order based on the image formation data and the number of pieces of the image formation data to be formed as images with reference to the input information; and
a transmission unit configured to transmit the state information,
the recording management unit generates the state information and records the generated state information in the storage unit.

11. The medium application system according to claim 10, wherein the roll management unit comprises:
a medium conveyance control unit configured to pull out the medium from the roll medium at a predetermined timing and convey the medium to the medium application device;
a reception unit configured to receive the state information;
a roll information management unit configured to generate the roll information in which roll identification information is associated with the state information corresponding to the roll medium in a reverse formation order, and record the generated roll information in the storage unit; and
a transmission unit configured to transmit the roll information to the medium application device when the medium conveyance control unit pulls out the medium from the roll medium and conveys the medium to the medium application device.

12. A management method executed by a management device, the method comprising:
creating a formation order indicating an order of forming an image corresponding to image formation data on a medium to be applied to an application target object;
inspecting whether the image formation data in accordance with the formation order matches with a read image obtained by reading the image formed on the medium in accordance with the formation order; and
transmitting state information in which the formation order is associated with an image formation state based on at least one of an image formation result of the image formation data and an inspection result obtained at the inspection, wherein
the creating comprises:
receiving an input of the image formation data and number of pieces of the image formation data to be formed as images;
generating input information in which the image formation data is associated with the number of pieces of the image formation data to be formed as images;
recording the input information in a storage unit;
creating the formation order based on the image formation data and the number of pieces of the image formation data to be formed as images with reference to the input information; and
transmitting the state information, and
the recording comprises generating the state information and recording the generated state information in the storage unit.

13. A computer-readable recording medium that contain a computer program that causes a computer to execute:
creating a formation order indicating an order of forming an image corresponding to image formation data on a medium to be applied to an application target object;
inspecting whether the image formation data in accordance with the formation order matches with a read image obtained by reading the image formed on the medium in accordance with the formation order; and
transmitting state information in which the formation order is associated with an image formation state based on at least one of an image formation result of the image formation data and an inspection result obtained at the inspecting, wherein
the creating comprises:
receiving an input of the image formation data and number of pieces of the image formation data to be formed as images;
generating input information in which the image formation data is associated with the number of pieces of the image formation data to be formed as images;
recording the input information in a storage unit;
creating the formation order based on the image formation data and the number of pieces of the image formation data to be formed as images with reference to the input information; and transmitting the state information, and the recording comprises generating the state information and recording the generated state information in the storage unit.

* * * * *